(12) United States Patent
Okazaki et al.

(10) Patent No.: US 12,535,815 B2
(45) Date of Patent: Jan. 27, 2026

(54) MANAGEMENT METHOD FOR MOBILE OBJECT, CONTROL METHOD FOR MOBILE OBJECT, MOBILE OBJECT, AND RECORDING MEDIUM STORING COMPUTER PROGRAM

(71) Applicant: MITSUBISHI HEAVY INDUSTRIES, LTD., Tokyo (JP)

(72) Inventors: Hirotaka Okazaki, Tokyo (JP); Kenji Takao, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 445 days.

(21) Appl. No.: 18/068,817

(22) Filed: Dec. 20, 2022

(65) Prior Publication Data

US 2023/0195124 A1 Jun. 22, 2023

(30) Foreign Application Priority Data

Dec. 20, 2021 (JP) .................................. 2021-206171
Dec. 19, 2022 (JP) .................................. 2022-201887

(51) Int. Cl.
*G05D 1/02* (2020.01)
*G05D 1/00* (2024.01)

(52) U.S. Cl.
CPC ......... *G05D 1/0214* (2013.01); *G05D 1/0088* (2013.01); *G05D 1/0223* (2013.01)

(58) Field of Classification Search
None
See application file for complete search history.

(56) References Cited

U.S. PATENT DOCUMENTS

| | | | |
|---|---|---|---|
| 9,625,911 B2 * | 4/2017 | Lee | ...................... G01S 13/931 |
| 11,275,386 B2 | 3/2022 | Grabbe et al. | |
| 11,755,011 B2 | 9/2023 | Flottran et al. | |
| 2010/0235051 A1 * | 9/2010 | Kariatsumari | .......... H02P 21/16 |
| | | | 318/400.15 |
| 2014/0095009 A1 | 4/2014 | Oshima et al. | |
| 2019/0220005 A1 | 7/2019 | Flottran et al. | |
| 2019/0271990 A1 | 9/2019 | Grabbe et al. | |

(Continued)

FOREIGN PATENT DOCUMENTS

| | | |
|---|---|---|
| DE | 102018100758 A1 | 7/2019 |
| DE | 102018104986 A1 | 9/2019 |

(Continued)

OTHER PUBLICATIONS

Office Action Issued in Corresponding German Application No. 102022214021.4, dated Feb. 20, 2025 (13 Pages with English Translation).

*Primary Examiner* — Anne Marie Antonucci
*Assistant Examiner* — Kyle S Park
(74) *Attorney, Agent, or Firm* — Osha Bergman Watanabe & Burton LLP

(57) ABSTRACT

A management method for a mobile object includes acquiring movement conditions for the mobile object that automatically moves, and setting a safety region as a region on a traveling direction side of the mobile object in which an object should not be positioned based on the movement conditions. The setting of the safety region includes setting the safety region so that the safety region is widened in a lateral direction intersecting with the traveling direction as a speed of the mobile object increases.

8 Claims, 19 Drawing Sheets

(56) References Cited

U.S. PATENT DOCUMENTS

| | | | | |
|---|---|---|---|---|
| 2020/0293063 A1* | 9/2020 | Aisu | .................. | G05D 1/0297 |
| 2021/0278502 A1* | 9/2021 | Impola | .................. | G01S 17/87 |
| 2023/0347861 A1* | 11/2023 | Sugawara | ............. | B60W 30/10 |
| 2024/0023473 A1* | 1/2024 | Iwase | .................. | G05D 1/2424 |

FOREIGN PATENT DOCUMENTS

| | | | |
|---|---|---|---|
| JP | 2000-267729 | A | 9/2000 |
| JP | 5830533 | B2 | 12/2015 |

* cited by examiner

FIG.11B
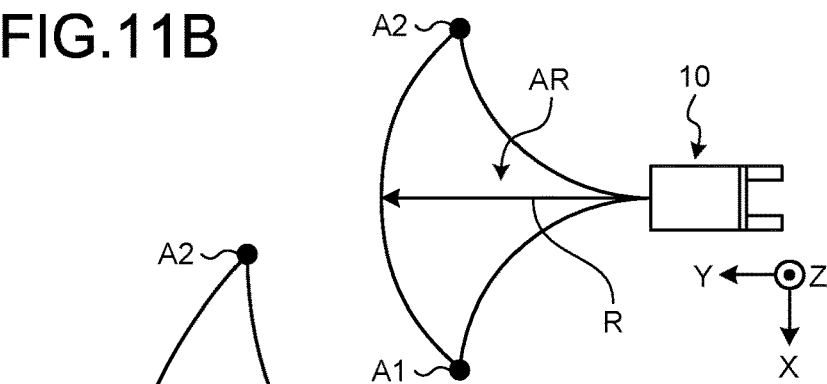
(A)
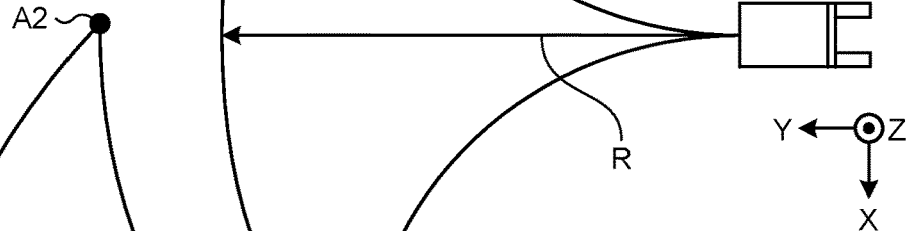
(B)
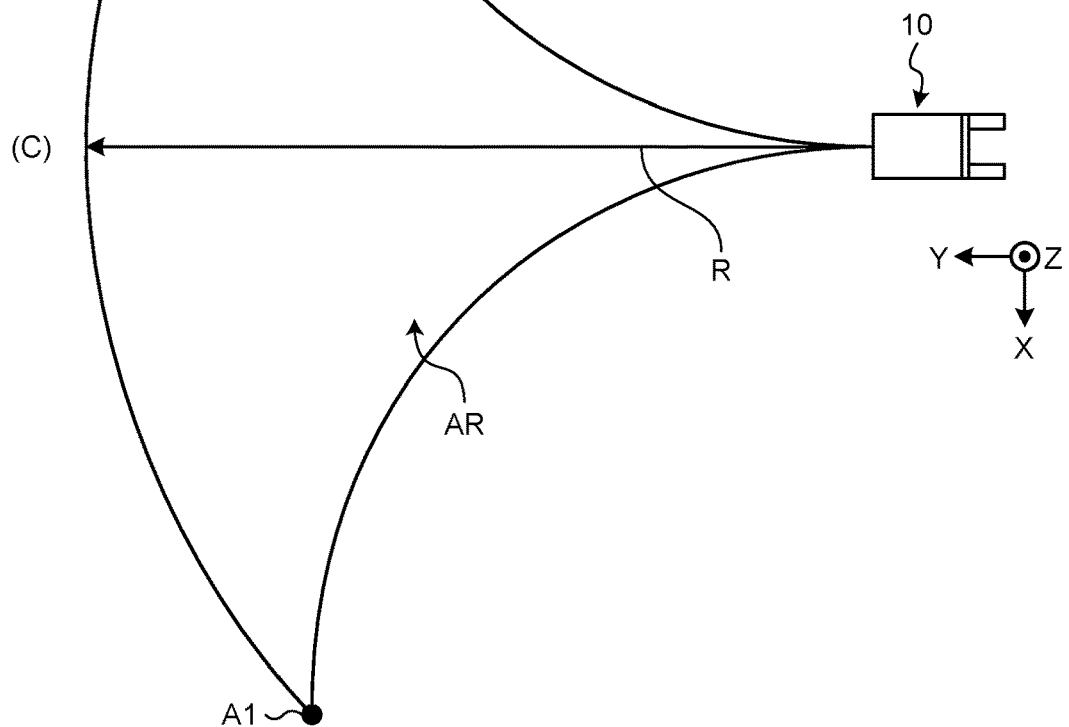
(C)

FIG.11C
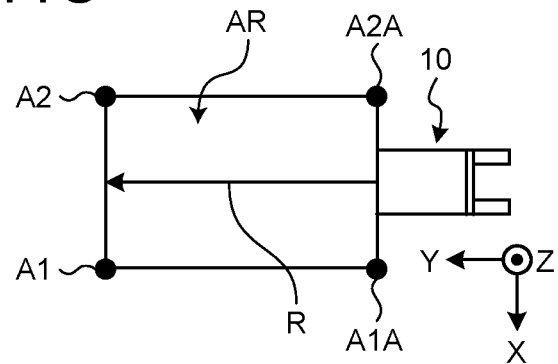
(A)
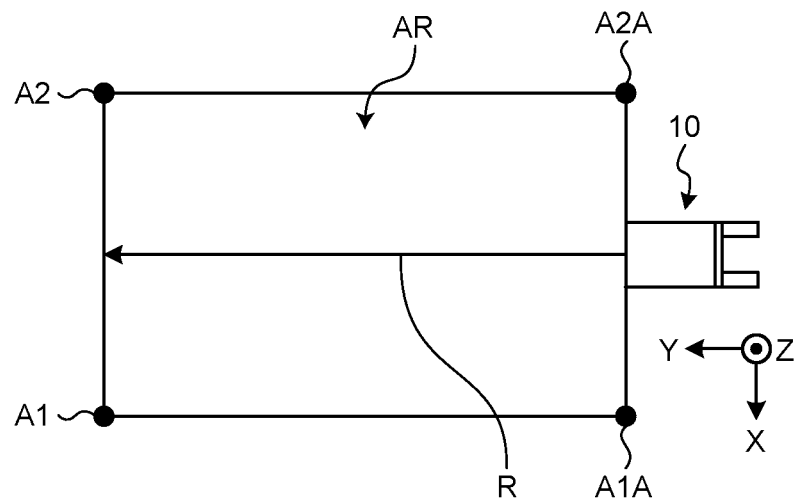
(B)
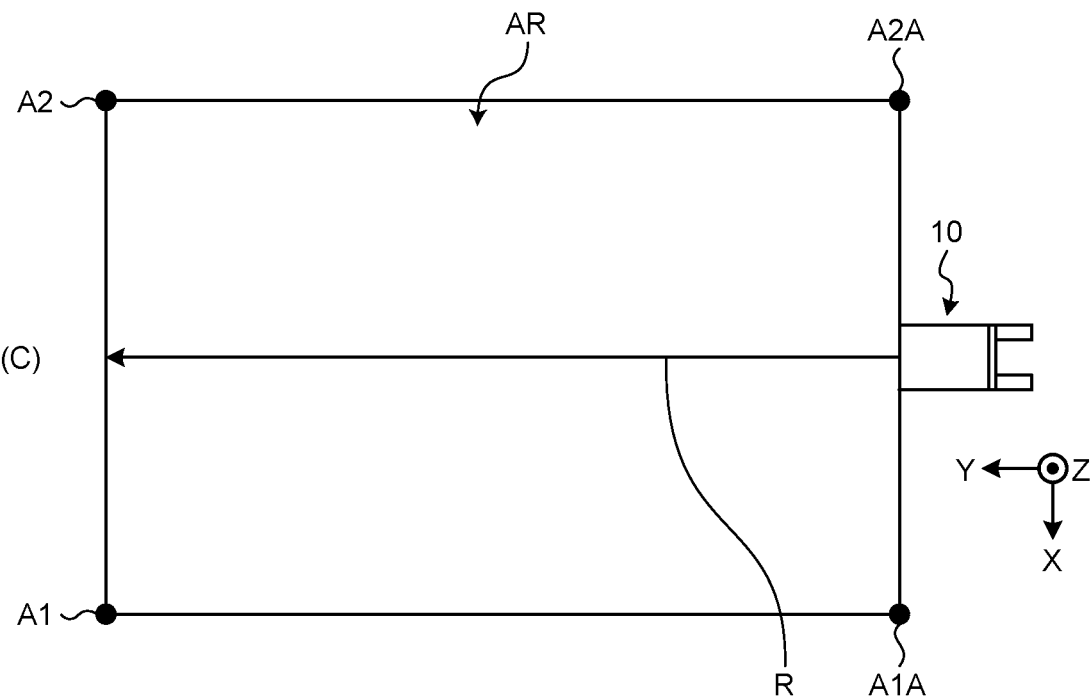
(C)

MANAGEMENT METHOD FOR MOBILE OBJECT, CONTROL METHOD FOR MOBILE OBJECT, MOBILE OBJECT, AND RECORDING MEDIUM STORING COMPUTER PROGRAM

CROSS-REFERENCE TO RELATED APPLICATIONS

The present application claims priority to and incorporates by reference the entire contents of Japanese Patent Applications No. 2021-206171 filed in Japan on Dec. 20, 2021 and No. 2022-201887 filed in Japan on Dec. 19, 2022.

FIELD

The present disclosure relates to a management method for a mobile object, a control method for a mobile object, a mobile object, and a recording medium storing a computer program.

BACKGROUND

For example, there is known a technique of causing a mobile object such as a forklift to automatically move. For example, Patent Literature 1 discloses a technique of suppressing collision between an obstacle and a mobile object that autonomously travels along a reference route, by determining a speed of the mobile object so that a predetermined passage distance with respect to the obstacle can be held in a traveling direction obtained from a motion vector from a previous position.

CITATION LIST

Patent Literature

Patent Literature 1: Japanese Patent No. 5830533

SUMMARY

Technical Problem

However, the mobile object also moves in a lateral direction by steering, so that the mobile object may interfere with an object present on a lateral direction side due to unreliable steering. Thus, there is a demand for suppressing interference with the object present on the lateral direction side.

The present disclosure aims at solving the problem described above, and an object thereof is to provide a management method for a mobile object, a control method for a mobile object, a mobile object, and a recording medium storing a computer program that can suppress interference with an object present on a lateral direction side.

Solution to Problem

To solve the problem described above and achieve the object, a management method for a mobile object according to the present disclosure includes: a step of acquiring movement conditions for the mobile object that automatically moves; and a step of setting based on the movement conditions a safety region as a region on a traveling direction side of the mobile object in which an object is not expected to be positioned. The step of setting the safety region includes setting the safety region so that the safety region is widened in a lateral direction intersecting with the traveling direction as a speed of the mobile object increases.

To solve the problem described above and achieve the object, a control method for a mobile object according to the present disclosure includes: a step of acquiring information on the safety region that is set by the above-described management method for the mobile object; and a step of causing the mobile object to move while detecting whether the object is not positioned in the safety region.

To solve the problem described above and achieve the object, a mobile object that automatically moves according to the present disclosure includes: a safety region acquisition unit that acquires information on a safety region that is set based on movement conditions for the mobile object as a region on a traveling direction side of the mobile object in which an object is not expected to be positioned; and a movement control unit that causes the mobile object to move while detecting whether the object is not positioned in the safety region. The safety region is set to be widened in a lateral direction intersecting with the traveling direction as a speed of the mobile object increases.

To solve the problem described above and achieve the object, a non-transitory computer-readable recording medium storing a computer program according to the present disclosure causes a computer to execute: a step of acquiring movement conditions for a mobile object that automatically moves; and a step of setting based on the movement conditions a safety region as a region on a traveling direction side of the mobile object in which an object is not expected to be positioned. The step of setting the safety region includes setting the safety region so that the safety region is widened in a lateral direction intersecting with the traveling direction as a speed of the mobile object increases.

Advantageous Effects of Invention

According to the present disclosure, it is possible to suppress interference with an object present on a lateral direction side.

BRIEF DESCRIPTION OF DRAWINGS

FIG. 11B is a schematic diagram for explaining another example of the safety region.

FIG. 11C is a schematic diagram for explaining another example of the safety region.

DESCRIPTION OF EMBODIMENTS

The following describes preferred embodiments of the present disclosure in detail with reference to the attached drawings. The present disclosure is not limited to the embodiments. In a case in which there are a plurality of embodiments, the present disclosure encompasses a combination of the embodiments.

First Embodiment

Entire Configuration of Movement Control System

Figure 1:
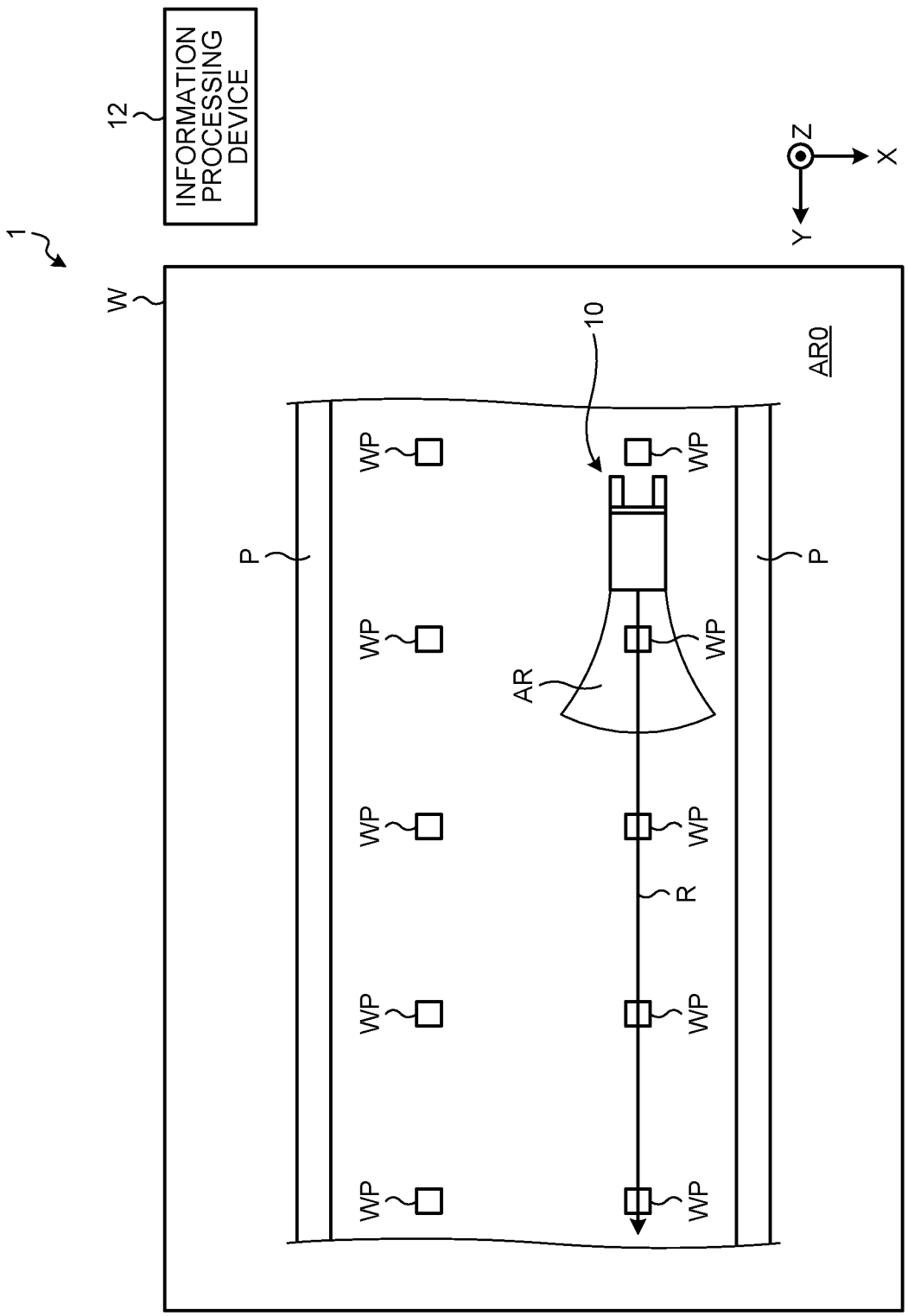
FIG. 1 is a schematic diagram of a movement control system according to the present embodiment.

FIG. 1 is a schematic diagram of a movement control system according to a first embodiment. As illustrated in FIG. 1, a movement control system 1 according to the first embodiment includes a mobile object 10 and an information processing device 12. The movement control system 1 is a system that controls movement of the mobile object 10 belonging to a facility W. The facility W is, for example, a facility such as a warehouse in which physical distribution is managed, but is not limited thereto. The facility W may be any facility, and may be outdoors, for example. In the movement control system 1, the mobile object 10 is caused to move in a region AR0 of the facility W. The region AR0 is, for example, a floor face of the facility W. Hereinafter, a direction along the region AR0 is assumed to be an X-direction, and a direction along the region AR0 and intersecting with the direction X is assumed to be a Y-direction. In the present embodiment, the Y-direction is a direction orthogonal to the X-direction. Each of the X-direction and the Y-direction may also be referred to as a direction along a horizontal plane. A direction orthogonal to the X-direction and the Y-direction, more specifically, a direction toward an upper side of a vertical direction is assumed to be a Z-direction. In the present embodiment, a "position" means a position (coordinates) in a coordinate system on a two-dimensional surface on a region AR (coordinate system of the region AR) unless otherwise specified. An "attitude" of the mobile object 10 is orientation of the mobile object 10 in the coordinate system of the region AR unless otherwise specified, and means a yaw angle (rotation angle) of the mobile object 10 assuming that the X-direction is 0°, when viewed from the Z-direction.

Mobile Object

Figure 2:
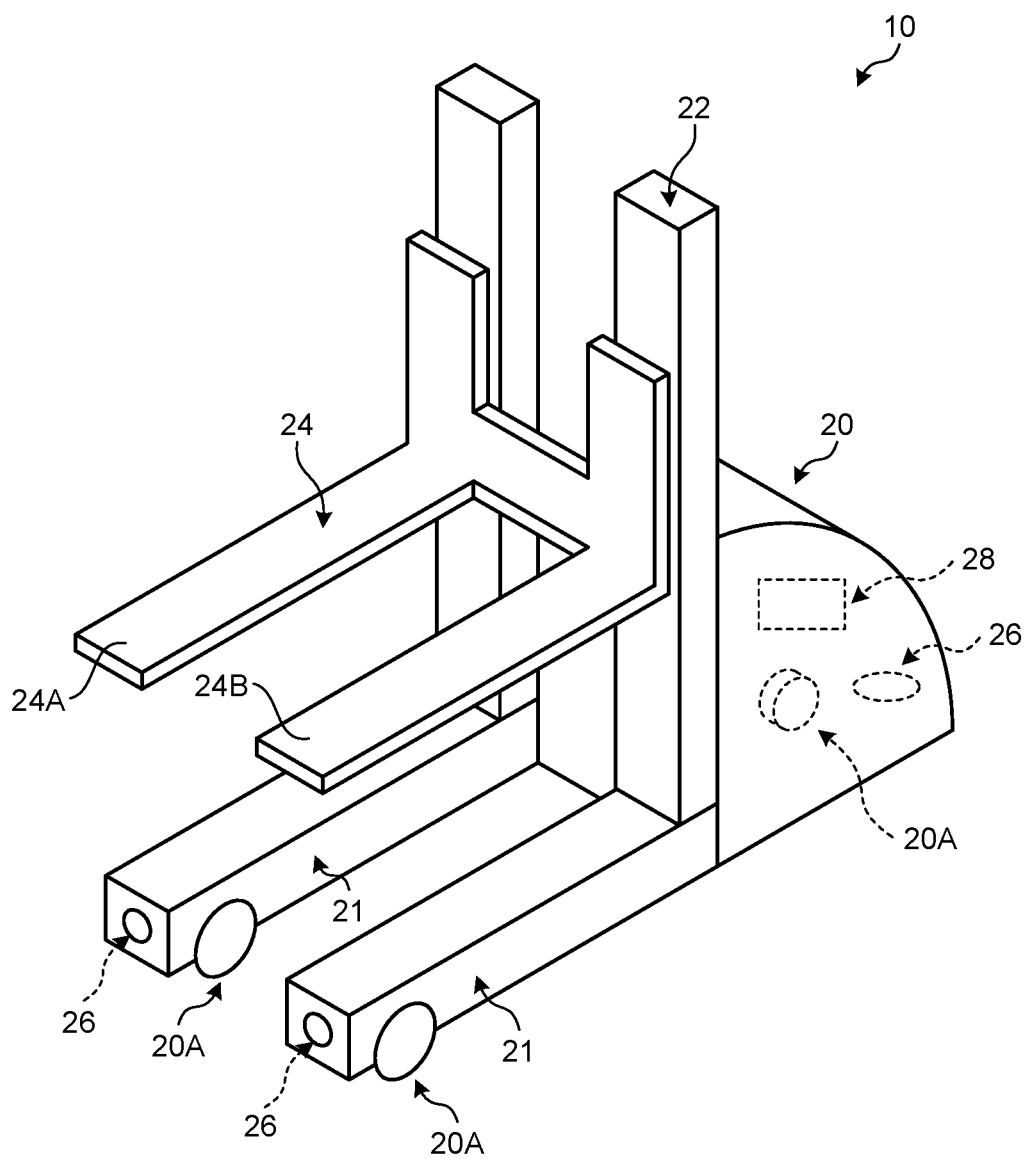
FIG. 2 is a schematic diagram of a configuration of a mobile object.

FIG. 2 is a schematic diagram of a configuration of the mobile object. The mobile object 10 is a device that can automatically move. The mobile object 10 may be any vehicle that can automatically move, for example, a nonholonomic mobile object that cannot move directly in a lateral direction. Specifically, in the present embodiment, the mobile object 10 is a forklift, more specifically, what is called an Automated Guided Forklift (AGF). As illustrated in FIG. 2, the mobile object 10 includes a vehicle body 20, wheels 20A, straddle legs 21, a mast 22, a fork 24, sensors 26, and a control device 28. The straddle legs 21 are a pair of axial members projecting from the vehicle body 20 disposed on one end part in a front and rear direction of the vehicle body 20. The wheels 20A are disposed on distal ends of the respective straddle legs 21 and the vehicle body 20. That is, the three wheels 20A are disposed in total, but positions and the number of the wheels 20A may be optional. The mast 22 is attached to the straddle leg 21 in a movable manner, and moves in the front and rear direction of the vehicle body 20. The mast 22 extends along an upper and lower direction (the direction Z herein) orthogonal to the front and rear direction. The fork 24 is attached to the mast 22 in a manner movable in the direction Z. The fork 24 may also be movable in a lateral direction (a direction intersecting with the upper and lower direction and the front and rear direction) of the vehicle body 20 with respect to the mast 22. The fork 24 includes a pair of hooks 24A and 24B. The hooks 24A and 24B extend toward a front direction of the vehicle body 20 from the mast 22. The hook 24A and the hook 24B are disposed to be separated from each other in a lateral direction of the mast 22. Hereinafter, regarding the front and rear direction, a direction toward a side on which the fork 24 is arranged in the mobile object 10 is assumed to be a front direction, and a direction toward a side on which the fork 24 is not arranged is assumed to be a rear direction.

Each of the sensors 26 detects at least one of a position and an attitude of an object that is present around the vehicle body 20. It can also be said that the sensor 26 detects the position of the object with respect to the mobile object 10, and the attitude of the object with respect to the mobile object 10. In the present embodiment, the sensors 26 are disposed on side surfaces of the mast 22 and on a rear direction side of the vehicle body 20. However, the positions at which the sensors 26 are disposed are not limited thereto. The sensors 26 may be disposed at optional positions, and the number of the sensors 26 to be disposed may also be optional. For example, a safety sensor installed on the mobile object 10 may also be used as the sensor 26. By using the safety sensor as the sensor 26, another sensor is not required to be installed.

The sensor 26 is, for example, a sensor that emits laser light. The sensor 26 emits laser light while performing scanning in one direction (herein, the lateral direction), and detects the position and orientation of the object from reflected light of the emitted laser light. That is, the sensor 26 can be assumed to be what is called a 2D-Light Detection And Ranging (LiDAR). However, the sensor 26 is not limited thereto, and may be a sensor that detects the object using an optional method. For example, the sensor 26 may be what is called a 3D-LiDAR that scans in a plurality of directions, or may be a camera.

The control device 28 controls movement of the mobile object 10. The control device 28 will be described later.

Information Processing Device

Figure 3:
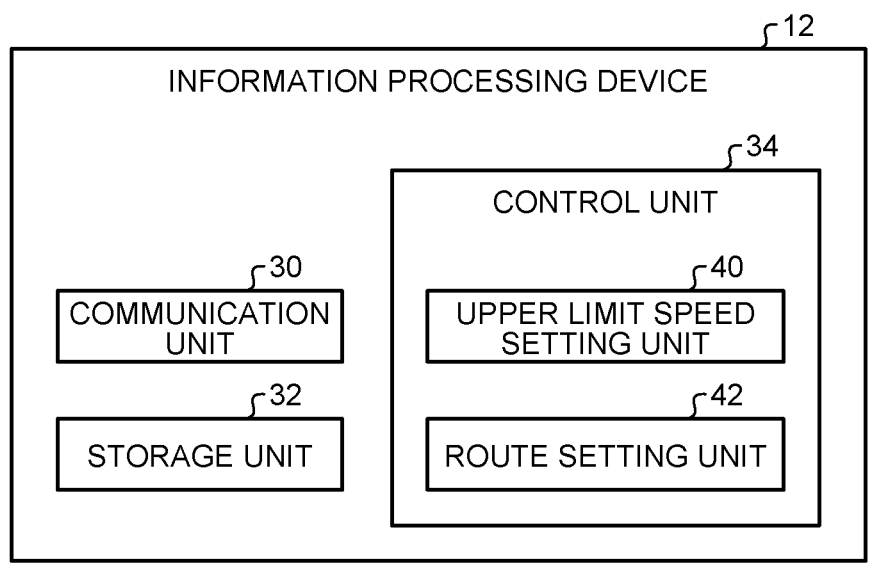
FIG. 3 is a schematic block diagram of an information processing device.

FIG. 3 is a schematic block diagram of the information processing device. The information processing device 12 is a device that is disposed in the facility W and at least performs an arithmetic operation of information related to movement of the mobile object 10 or the like, that is, what is called a ground system. However, a disposition position or the like of the information processing device 12 is optional, and is not limited to what is called a ground system. The information processing device 12 is a computer, and includes a communication unit 30, a storage unit 32, and a control unit 34 as illustrated in FIG. 3. The communication unit 30 is a module that is used by the control unit 34 to communicate with an external device such as the mobile object 10, and may include an antenna, for example. A communication scheme used by the communication unit 30 is wireless communication in the present embodiment, but the communication scheme may be optional. The storage unit 32 is a memory that stores various kinds of information such as a computer program or arithmetic content of the control unit 34, and includes at least one of a random access memory (RAM), a main storage device such as a read only memory (ROM), and an external storage device such as a hard disk drive (HDD), for example.

The control unit 34 is an arithmetic device, and includes an arithmetic circuit such as a central processing unit (CPU), for example. The control unit 34 includes an upper limit speed setting unit 40 and a route setting unit 42. The control unit 34 implements the upper limit speed setting unit 40 and the route setting unit 42 by reading out, from the storage unit 32, and executing a computer program (software), and performs processing thereof. The control unit 34 may perform the processing by one CPU, or may include a plurality of CPUs and perform the processing by the CPUs. At least a part of the upper limit speed setting unit 40 and the route setting unit 42 may be implemented by a hardware circuit. A computer program for the control unit 34 stored in the storage unit 32 may be stored in a recording medium that can be read by the information processing device 12.

Upper Limit Speed Setting Unit

The upper limit speed setting unit 40 sets an upper limit speed that is an upper limit of a moving speed of the mobile object 10 in the facility W. That is, it can be said that the mobile object 10 moves at a moving speed equal to or lower than the upper limit speed. Herein, in the facility W, a plurality of routes along which the mobile object 10 can move are set in advance, and the mobile object 10 moves along a route R selected from the routes. In the present embodiment, the upper limit speed setting unit 40 sets the upper limit speed for each route per unit length (unit route). More specifically, as illustrated in FIG. 1, waypoints WP are set for respective positions (coordinates) in the region AR, and the route R is set to connect the waypoints WP. That is, a route connecting the waypoints WP that are selected to be passed by the mobile object 10 is the route R of the mobile object 10. In this case, for example, it can be said that a route connecting the adjacent waypoints WP is the unit route. However, the unit route does not necessarily indicate the route connecting a pair of adjacent waypoints WP, but may be a route connecting three or more waypoints WP. Lengths of respective unit routes are not necessarily the same, and each unit route may be optionally set.

The upper limit speed setting unit 40 sets the upper limit speed so that an object P is not positioned in a safety region AR that is set in a case of assuming that the mobile object 10 moves at the upper limit speed. The safety region AR is a region set around the mobile object 10 (for example, on a traveling direction side of the mobile object 10) as a region in which the object P should not be positioned. The object P indicates an object with which the mobile object 10 should not interfere. As the object P, exemplified are a structure the position of which is fixed in the facility W such as a wall or a pillar in the facility W, an object the position of which moves in the facility W such as another mobile object 10 or a person, and a boundary between a region that the mobile object 10 should not enter and a region that the mobile object 10 can enter. The boundary between the region that the mobile object 10 should not enter and the region that the mobile object 10 can enter may be white lines or the like the positions of which are fixed, the white lines arranged on both lateral sides of the region in which the mobile object 10 can move. Regarding the object P the position of which is fixed such as a structure or a boundary, the position thereof is known before the mobile object 10 moves. On the other hand, regarding the object P the position of which moves such as another mobile object or a person, it can be said that the position thereof is not known.

Safety Region

Figure 4:
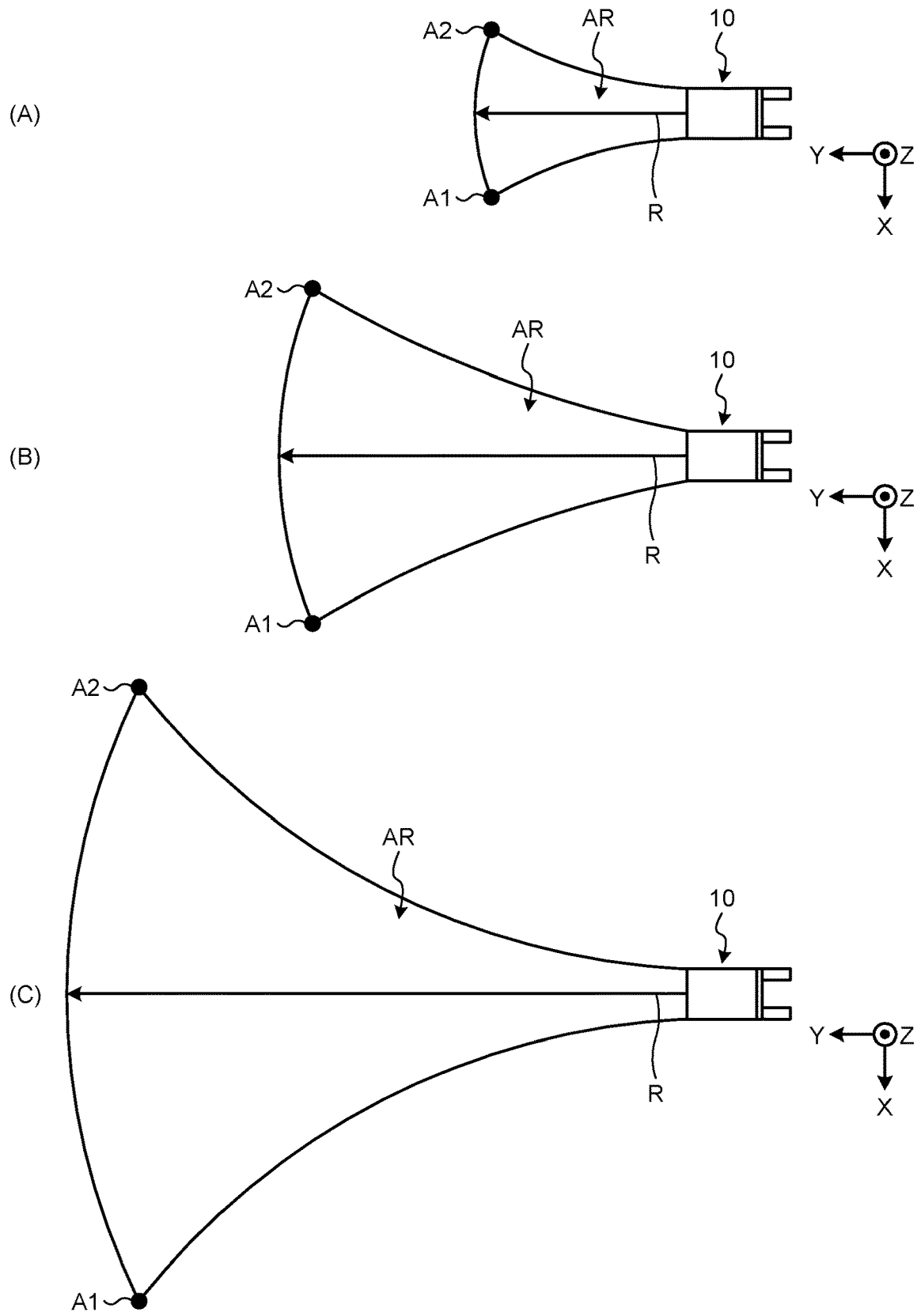
FIG. 4 is a schematic diagram for explaining a safety region.

The following specifically describes the safety region AR. FIG. 4 is a schematic diagram for explaining the safety region. The safety region AR is set to be widened in the lateral direction intersecting with the traveling direction of the mobile object 10 as the moving speed of the mobile object 10 increases. Additionally, it is preferable that the safety region AR is set to be widened also in the traveling direction of the mobile object 10 as the moving speed of the mobile object 10 increases. In other words, it can be said that a relation between the moving speed of the mobile object 10 and the length in the lateral direction of the safety region AR is set so that the length in the lateral direction of the safety region AR increases as the moving speed increases, and a relation between the moving speed of the mobile object 10 and the length in the traveling direction of the safety region AR is set so that the length in the traveling direction of the safety region AR increases as the moving speed increases. FIG. 4 illustrates an example of the safety region AR for each moving speed in a case in which the traveling direction of the mobile object 10 is the Y-direction, the moving speed is higher in (B) than (A), and the moving speed is higher in (C) than (B). Thus, in the example of FIG. 4, the lengths in the lateral direction (herein, the X-direction) and the traveling direction (herein, the Y-direction) of the safety region AR are longer in (B) than (A), and longer in (C) than (B).

The safety region AR is set based on movement conditions for the mobile object 10. The safety region AR may be set by using an optional method based on the movement conditions for the mobile object 10 so that the length in the lateral direction increases as the moving speed increases. The movement condition indicates a condition under which the mobile object 10 moves, and may be a steering angle command for the mobile object 10 in the present embodiment, for example. That is, in the present embodiment, the safety region AR is preferably set based on a reference value of the steering angle command for the mobile object 10. The steering angle command indicates a command value of a steering angle of the mobile object 10, in other words, a command value for specifying an attitude of the mobile object 10 in the future. In this case, the safety region AR is set to include an assumed arrival position assuming that the reference value of the steering angle command is continuously input to the mobile object 10. The assumed arrival position indicates a position at which the mobile object 10 is assumed to arrive at the time of stoppage in a case in which the reference value of the steering angle command is continuously input to the mobile object 10. For example, in the example of FIG. 4, a region surrounded by an assumed arrival position A1 on the X-direction side, an assumed arrival position A2 on the Y-direction side, and a current position of the mobile object 10 is set as the safety region AR. The assumed arrival position A1 is an assumed arrival position at the time when the reference value of the steering angle command is set to the X-direction side, and the assumed arrival position A2 is an assumed arrival position at the time when the reference value of the steering angle command is set to the opposite side of the X-direction. The reference value of the steering angle command may be optionally set, for example, may be a worst value of the steering angle command. The worst value of the steering angle command may indicate a maximum value of the steering angle command that can be input to the mobile object 10.

Furthermore, in the present embodiment, it is more preferable that the safety region AR is set based on the reference value of the steering angle command for the mobile object 10 and a reference value of a torque command for the mobile object 10. The torque command indicates a command value of driving torque of the mobile object 10. The speed of the mobile object 10 depends on the driving torque, so that it can be said that the torque command is a command value for specifying the speed of the mobile object 10 in the future. In this case, the safety region AR is set to include an assumed arrival position assuming that the reference value of the steering angle command is continuously input to the mobile object 10 and the reference value of the torque command is input to the mobile object 10. In this case, the assumed arrival position indicates a position at which the mobile object 10 is assumed to arrive at the time of stoppage in a case in which the reference value of the steering angle command is continuously input to the mobile object 10 and the reference value of the torque command is input to the mobile object 10. For example, in the example of FIG. 4, a region surrounded by an assumed arrival position A1 on the X-direction side, an assumed arrival position A2 on the Y-direction side, and a current position of the mobile object 10 is set as the safety region AR. The reference value of the torque command may be optionally set, for example, may be a worst value of the torque command. The worst value of the torque command may indicate a value with which a timing when the mobile object 10 starts to decelerate becomes the latest in an assumed range.

More specifically, in the present embodiment, the safety region AR is preferably set, based on a movement model of the mobile object 10, by using the reference value of the steering angle command, the reference value of the driving torque, and a current speed of the mobile object 10 as input values (movement conditions) for the movement model. Herein, in a case in which a movement model x of the mobile object 10 is assumed to be an equivalent two-wheel model, more specifically, in a case in which the movement model x of the mobile object 10 is an equivalent two-wheel model including two rear wheels that are not driven and steered and one front wheel that is driven and steered, the movement model x is represented by the following Expression (1).

[Math 1]

$$x \triangleq [X Y \theta_z v_x v_y \omega_z \delta_a T_m]^T \quad (1)$$

In Expression (1), X is a position (coordinate) in the X-direction of the mobile object 10, Y is a position (coordinate) in the Y-direction of the mobile object 10, $\theta_z$ is an attitude (yaw angle) of the mobile object 10, $v_x$ is a speed in the X-direction of the mobile object 10, $v_y$ is a speed in the Y-direction of the mobile object 10, $\omega_z$ is an angular speed (speed in a yaw angle direction) of the mobile object 10, $\delta_a$ is a steering angle command value, and $T_m$ is a torque command value. Herein, T indicates transposition. That is, it can be said that the movement model x indicates the position, the attitude, the speed, the angular speed, the steering angle command value, and the torque command value of the mobile object 10.

In the present embodiment, a derivative value x' of the movement model x is calculated based on the reference value of the steering angle command, the reference value of the driving torque, the current speed and the angular speed of the mobile object 10, and the derivative value x' is integrated to calculate the movement model x at the timing when the mobile object 10 stops. That is, by successively calculating the derivative value x' at each timing from a current timing until the mobile object 10 stops, the movement model x at the timing when the mobile object 10 stops is calculated. Assuming that (X, Y) of the movement model x at the timing when the mobile object 10 stops is the assumed arrival position, the safety region AR is set to include the assumed arrival position.

Specifically, the derivative value x' is represented by the following Expression (2).

$$x' = f(x, u) \triangleq \begin{bmatrix} v_x \cos\theta_z - v_y \sin\theta_z \\ v_x \sin\theta_z + v_y \cos\theta_z \\ \omega_z \\ \frac{1}{m}\left(\frac{R_G T_m}{r_D} - K_f \beta_f \sin(\delta_a - \beta_f) - 2K_r \beta_r \sin\beta_r - C_a v_x^2\right) - \mu_f g - v_f \omega_z \\ \frac{1}{m}(K_f \beta_f \cos(\delta_a + \beta_f) + 2K_r \beta_r \cos\beta_r) + v_y \omega_z \\ \frac{1}{I_z}(l_f K_f \beta_f \cos(\delta_a + \beta_f) - 2l_f K_r \beta_r \cos\beta_r) \\ \frac{\delta - \delta_a}{\tau_a} \\ \frac{T - T_m}{\tau_m} \end{bmatrix} \quad (2)$$

In Expression (2), $v_x$, $v_y$, $\theta_z$, $\omega_z$, $\delta_a$, and $T_m$ respectively indicate the speed in the X-direction, the moving speed in the Y-direction, the attitude, the angular speed, the steering angle command value, and the torque command value at an immediately preceding timing. Other symbols in Expression (2) are described below.

m: Mass of mobile object 10

$C_a$: Air resistance constant $\mu_f$: Rolling resistance coefficient $l_f$: Distance from center of gravity of mobile object 10 to front wheel $l_r$: Distance from center of gravity of mobile object 10 to rear wheel $I_z$: Moment of inertia in turning direction a: Half value of full width of mobile object 10 c: Half value of full length of mobile object 10

$K_f$: Cornering power of front wheel $K_r$: Cornering power of rear wheel $r_D$: Front wheel diameter $r_L$: Rear wheel diameter $R_G$: Gear ratio $J_g$: Inertia of gear $\tau_m$: Motor time constant $T_{up}$: Maximum value of motor torque $\tau_a$: Dead time of steering system $\theta_{max}$: Maximum steering angle g: Gravity acceleration Additionally, $\beta_f$ and $\beta_r$ in Expression (2) are respectively represented by the following Expressions (3) and (4).

[Math 3]
$$\beta_f = \arctan\left(\frac{v_y + l_f\omega_z}{v_x}\right) - \delta_a \quad (3)$$

[Math 4]
$$\beta_f = \arctan\left(\frac{v_y - l_r\omega_z}{v_x}\right) \quad (4)$$

Upper Limit Speed

In a case of setting the upper limit speed, the upper limit speed setting unit 40 sets the upper limit speed so that the object P the position of which is known is not positioned in the safety region AR that is set in a case in which the mobile object 10 moves at the upper limit speed. In the example of the present embodiment, the upper limit speed setting unit 40 calculates the safety region AR for each speed of the mobile object 10 by calculating the safety region AR while using predetermined reference values as a steering angle command value, a driving torque value, and values used for calculating the movement model x (that is, numerical values of symbols in Expression (2)) as movement conditions (input values) for the movement model of the mobile object 10, and causing the current speed of the mobile object 10 to vary. The upper limit speed setting unit 40 then reads out, based on map information, a position of the object P (a structure or a boundary) the position of which is fixed. In a case in which the mobile object 10 is assumed to be positioned on the unit route (on the waypoint WP or between the waypoints WP), the upper limit speed setting unit 40 determines whether the object P the position of which is read out interferes with each safety region AR for each speed of the mobile object 10 (whether the object P is positioned in the safety region AR). The upper limit speed setting unit 40 sets, as the upper limit speed, the speed of the mobile object 10 in a case in which the object P does not interfere with the safety region AR. More specifically, the upper limit speed setting unit 40 preferably sets, as the upper limit speed, a maximum value of the speed of the mobile object 10 in a case in which the object P does not interfere with the safety region AR. The upper limit speed setting unit 40 sets the upper limit speed for each unit route using the same method. It can be said that the upper limit speed setting unit 40 sets the upper limit speed for each unit route so that the upper limit speed becomes higher as the distance of the unit route from the object P (a structure or a boundary) the position of which is fixed is longer.

The upper limit speed setting unit 40 sets the upper limit speed as described above, but a method for setting the upper limit speed is not limited to the method described above, but may be optional. Furthermore, the upper limit speed is not necessarily set.

Route Setting Unit

The route setting unit 42 sets the route R along which the mobile object 10 moves. The route setting unit 42 transmits information on the set route R to the mobile object 10 via the communication unit 30. The route setting unit 42 may set the waypoints WP through which the mobile object 10 passes, for example, and transmit positional information on the route R connecting the waypoints WP through which the mobile object 10 passes to the mobile object 10 as information on the route R. Alternatively, the route setting unit 42 may transmit positional information on the waypoint WP through which the mobile object 10 passes to the mobile object 10 as information on the route R. The route setting unit 42 may set the route R along which the mobile object 10 moves (herein, the waypoints WP through which the mobile object 10 passes, for example) using an optional method. For example, the route setting unit 42 acquires information on the current position of the mobile object 10 from the mobile object 10, and acquires information on a target position of the mobile object 10 that is set based on work content of the mobile object 10, for example. The route setting unit 42 may set, as the route R, a route (waypoints WP) from the current position to the target position.

In the present embodiment, the route setting unit 42 transmits, to the mobile object 10, information on the upper limit speed on the unit route including the route R along which the mobile object 10 moves, via the communication unit 30. That is, it can be said that the route setting unit 42 preferably transmit the route R of the mobile object 10 and the upper limit speed on the route R to the mobile object 10.

Control Device for Mobile Object

Figure 5:
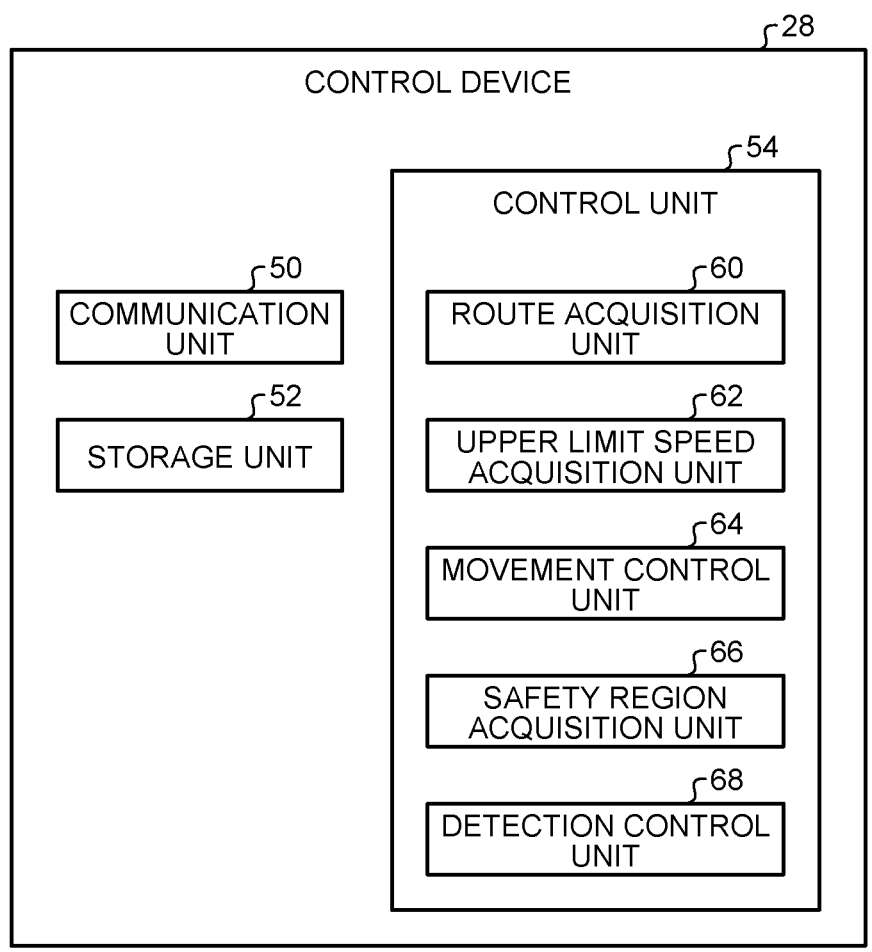
FIG. 5 is a schematic block diagram of a control device for the mobile object.

Next, the following describes the control device 28 for the mobile object 10. FIG. 5 is a schematic block diagram of the control device for the mobile object. The control device 28 causes the mobile object 10 to move by controlling the mobile object 10. The control device 28 is a computer, and includes a communication unit 50, a storage unit 52, and a control unit 54 as illustrated in FIG. 5. The communication unit 50 is a module that is used by the control unit 54 to communicate with an external device such as the information processing device 14, and may include an antenna or the like, for example. A communication scheme used by the communication unit 50 is wireless communication in the present embodiment, but the communication scheme may be optional. The storage unit 52 is a memory that stores various kinds of information such as a computer program or arithmetic content of the control unit 54, and includes at least one of a RAM, a main storage device such as a ROM, and an external storage device such as an HDD, for example.

The control unit 54 is an arithmetic device, and includes an arithmetic circuit such as a CPU, for example. The control unit 54 includes a route acquisition unit 60, an upper limit speed acquisition unit 62, a movement control unit 64, a safety region acquisition unit 66, and a detection control unit 68. The control unit 54 implements the route acquisition unit 60, the upper limit speed acquisition unit 62, the movement control unit 64, the safety region acquisition unit 66, and the detection control unit 68 by reading out, from the storage unit 52, and executing a computer program (software), and performs processing thereof. The control unit 54 may perform the processing by one CPU, or may include a plurality of CPUs and perform the processing by the CPUs. At least part of the route acquisition unit 60, the upper limit speed acquisition unit 62, the movement control unit 64, the safety region acquisition unit 66, and the detection control unit 68 may be implemented by the hardware circuit.

A computer program for the control unit 54 stored in the storage unit 52 may be stored in the recording medium that can be read by the control device 28.

Route Acquisition Unit

The route acquisition unit 60 acquires the information on the route R. The route acquisition unit 60 acquires the information on the route R from the information processing device 14. However, the route acquisition unit 60 does not necessarily acquire the route R from the information processing device 14, but may set the route R by itself. In this case, for example, the route acquisition unit 60 may acquire the positional information on the waypoint WP and information on the target position from the information processing device 14, and set, as the route R, a route from a current self-position to the target position via the waypoint WP.

Upper Limit Speed Acquisition Unit

The upper limit speed acquisition unit 62 acquires information on the upper limit speed of the route R. The route acquisition unit 60 acquires the information on the upper limit speed on the route R from the information processing device 14.

Movement Control Unit

The movement control unit 64 controls movement of the mobile object 10 by controlling a moving mechanism such as a driving unit or a steering system of the mobile object 10. The movement control unit 64 causes the mobile object 10 to move along the route R acquired by the route acquisition unit 60. By successively grasping the positional information on the mobile object 10, the movement control unit 64 causes the mobile object 10 to move to pass through the route R. A method of acquiring the positional information on the mobile object 10 is optional. For example, in the present embodiment, a detection body (not illustrated) is disposed in the facility W, and the movement control unit 64 acquires information about the position and the attitude of the mobile object 10 based on detection of the detection body. Specifically, the mobile object 10 emits laser light toward the detection body, and receives reflected light of the laser light reflected from the detection body to detect the position and the attitude of the mobile object 10 in the facility W. However, a method of acquiring the information about the position and the attitude of the mobile object 10 is not limited to using the detection body. For example, Simultaneous Localization and Mapping (SLAM) may be used.

Safety Region Acquisition Unit

The safety region acquisition unit 66 acquires information on the safety region AR. The shape and the size of the safety region AR vary depending on the movement conditions such as the speed of the mobile object 10, so that the safety region acquisition unit 66 successively sets the safety region AR at the time when the mobile object 10 is moving. The safety region acquisition unit 66 calculates the safety region AR based on current movement conditions for the mobile object 10 using the same method as the calculation method by the upper limit speed setting unit 40 described above. In this case, among the current movement conditions for the mobile object 10, a value set in advance may be used for the movement condition set in advance (for example, a condition specific to the vehicle the value of which does not vary, such as a weight of the mobile object 10), and a condition that is not set in advance and the value of which varies (for example, the speed of the mobile object 10 or the like) may be detected by a sensor disposed in the mobile object 10, for example. However, the safety region acquisition unit 66 does not necessarily successively calculate the safety region AR using the same method as the calculation method by the upper limit speed setting unit 40 described above. In this case, for example, a correspondence relation between the movement condition (for example, the speed of the mobile object 10), and the size and the shape of the safety region AR may be set in advance, and the safety region acquisition unit 66 may acquire, as the safety region AR to be applied, the safety region AR having the size and the shape associated with the current movement conditions for the mobile object 10 in the correspondence relation set in advance.

Detection Control Unit

The detection control unit 68 detects the object P around the mobile object 10. In the present embodiment, the detection control unit 68 causes the sensor 26 to detect the object P. For example, in a case in which the sensor 26 is configured to emit laser light, the detection control unit 74 causes the sensor 26 to emit laser light toward the periphery of the mobile object 10 while the mobile object 10 is moving along the route R. The object P reflects the laser light from the sensor 26, and the sensor 26 receives reflected light from the object P. The detection control unit 68 calculates the position of the object P based on a detection result of the reflected light received by the sensor 26.

However, a method of detecting the object P by the detection control unit 68 is not limited to using the sensor 26. For example, regarding the object P (a structure or a boundary) the position of which is known, the position thereof can be grasped in advance based on the map information, so that the detection control unit 68 may calculate the position of the object P the position of which is known based on the map information. Regarding the object P the position of which is not known (another mobile object 10, a person, and the like), the position thereof is preferably detected by using the sensor 26.

Control of Mobile Object

Figure 6:
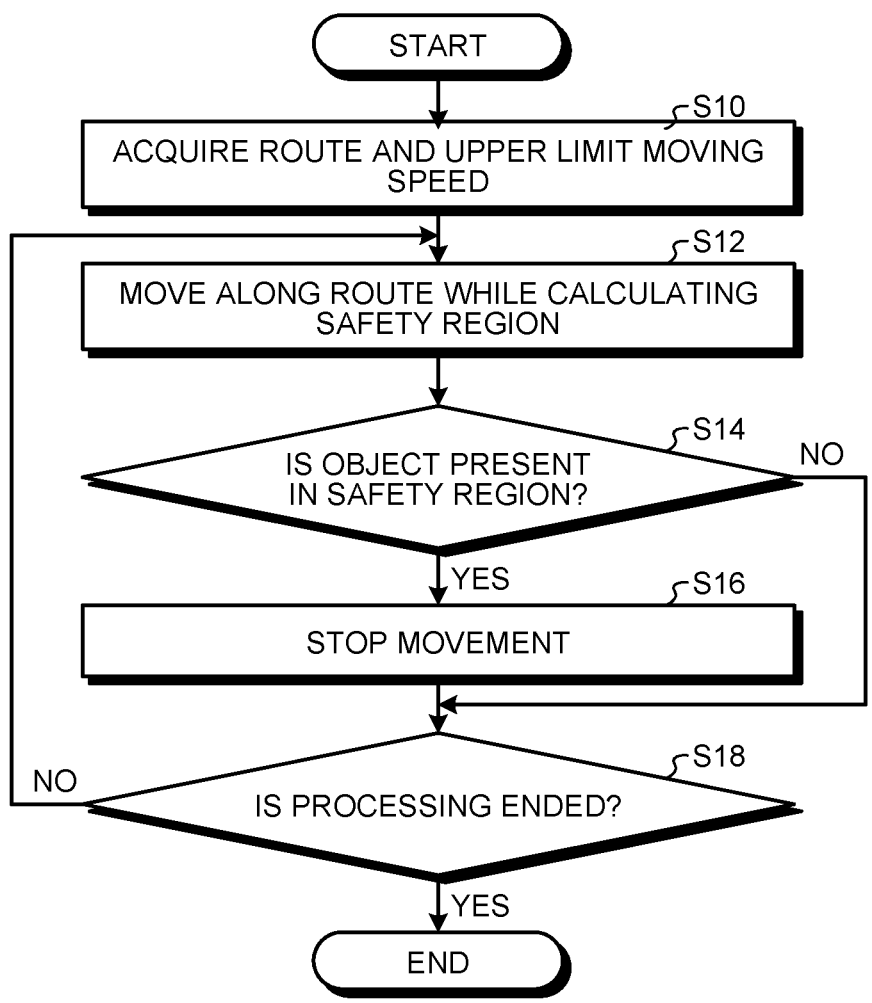
FIG. 6 is a flowchart for explaining a control flow for causing the mobile object to move.

The following describes a control flow for causing the mobile object 10 to move by the control device 28 of the mobile object 10. FIG. 6 is a flowchart for explaining the control flow for causing the mobile object to move. As illustrated in FIG. 6, the control device 28 acquires the route R for the mobile object 10 and the upper limit speed on the route R by the route acquisition unit 60 and the upper limit speed acquisition unit 62 (Step S10). The control device 28 causes the mobile object 10 to move along the route R by the movement control unit 64 while performing calculation of the safety region AR by the safety region acquisition unit 66, detection of the position of the object P by the detection control unit 68, and detection of the self-position by the movement control unit 64 (Step S12). In the present embodiment, the movement control unit 64 causes the mobile object 10 to move along the route R at a speed equal to or lower than the upper limit speed acquired by the upper limit speed acquisition unit 62. As described above, in the present embodiment, the upper limit speed is set for each unit route, so that, in a case in which the route R includes a plurality of the unit routes, the movement control unit 64 may cause the mobile object 10 to move at a speed equal to or lower than the upper limit speed on the unit route on which the mobile object 10 is currently moving.

The movement control unit 64 determines whether the object P is positioned in the safety region AR while causing the mobile object 10 to move along the route R (Step S14). Specifically, the movement control unit 64 determines whether the object P detected by the detection control unit 68 is positioned in a region of the current safety region AR that is set with respect to the current self-position. As described above, the detection control unit 68 may detect the position of the object P by the sensor 26, or may detect the position of the object P from the map information. If the object P is positioned in the safety region AR (Yes at Step S14), the movement control unit 64 stops movement of the mobile object 10 (Step S16). When the movement of the mobile object 10 is stopped, the process proceeds to Step S18. In a case of not ending the processing (No at Step S18), the process returns to Step S12, and the movement is started again so that the object P is not positioned in the safety region AR. On the other hand, if the object P is not positioned in the safety region AR (No at Step S14), the process also proceeds to Step S18. In a case of not ending the processing, the process returns to Step S12, and the movement is continued. In a case of ending the processing at Step S18 (Yes at Step S18), this processing is ended.

As described above, in the present embodiment, the safety region AR is set so that the length in the lateral direction of the safety region AR increases as the speed of the mobile object 10 increases. In this way, by setting the safety region AR to be wide in the lateral direction depending on the speed, interference between the mobile object 10 and the object P present in the lateral direction can be appropriately suppressed even in a case in which the mobile object 10 unintentionally moves in the lateral direction before stopping due to unreliable steering, for example. The safety region AR that is wide in the lateral direction can be appropriately set by setting the safety region AR based on the reference values of the steering angle command and the torque command, so that interference with the object P present in the lateral direction can be suppressed more appropriately. Additionally, by setting the upper limit speed based on the safety region AR, the upper limit speed is not uniformly set, and the upper limit speed can be increased for a route the position of which is distant from the known object P, for example. Accordingly, working efficiency can be improved.

Other Examples of Setting of Route

Next, the following describes another example of setting of the route of the mobile object 10. In this example, in setting the route of the mobile object 10, the route setting unit 42 of the information processing device 14 specifies a passage (region) in which the mobile object 10 is scheduled to move in the facility W based on the current position and the target position of the mobile object 10. In a case in which the passage is a two-way passage including two or more lanes, and another mobile object is not scheduled to move in the passage in the same time period, the route of the mobile object 10 in this passage is caused to be a route away from the object P the position of which is known such as a wall or a boundary. By causing the route to be away from the object P, a distance between the mobile object 10 and the object P is increased, so that the speed of the mobile object 10 can be increased. That is, even if the safety region AR is widened due to an increase in speed, the distance to the object P is long, so that the object P does not enter the safety region AR and the mobile object 10 can move at high speed. More specific description will be made hereinafter.

Figure 7:
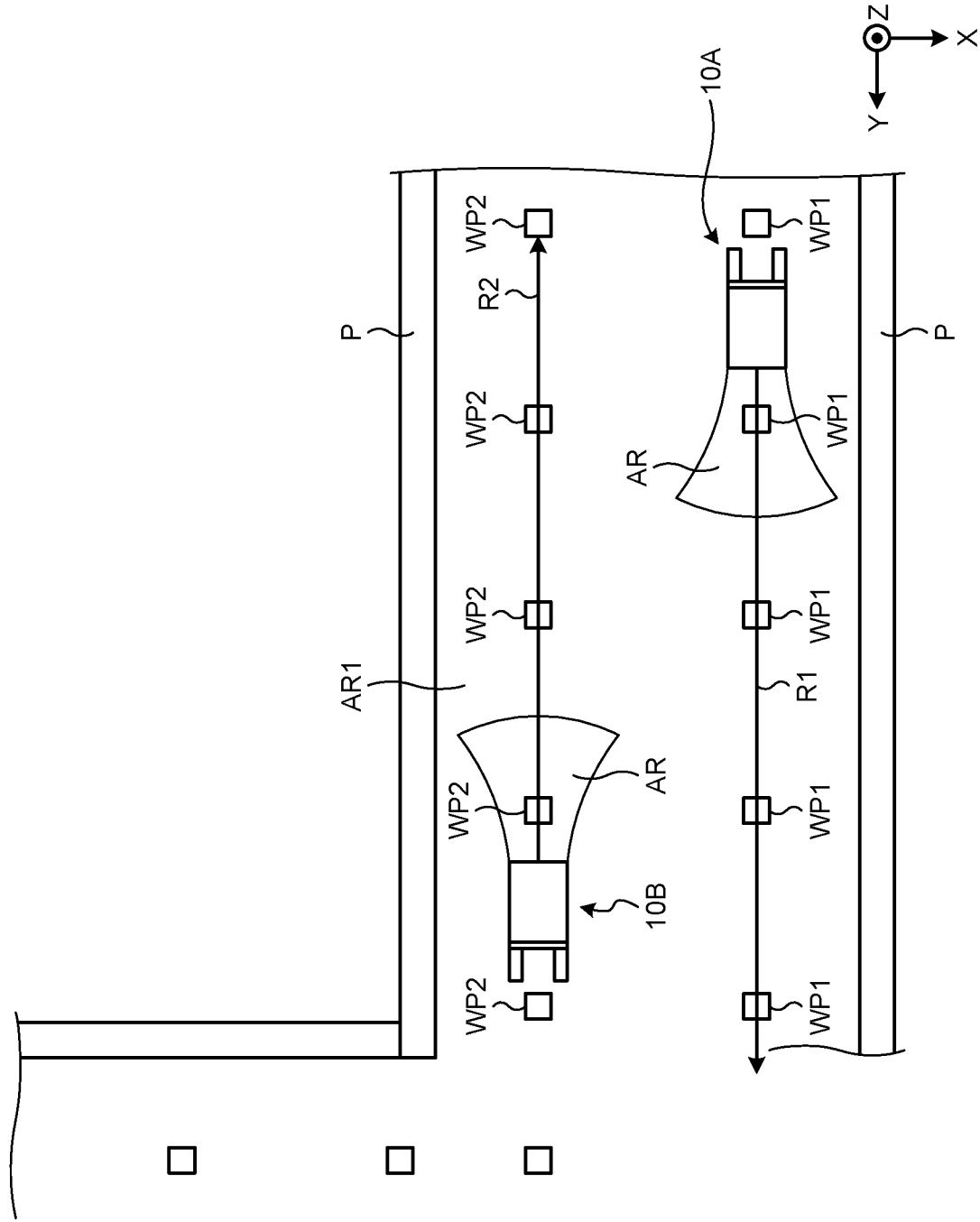
FIG. 7 is a schematic diagram for explaining another example of setting of a route of the mobile object.
Figure 8:
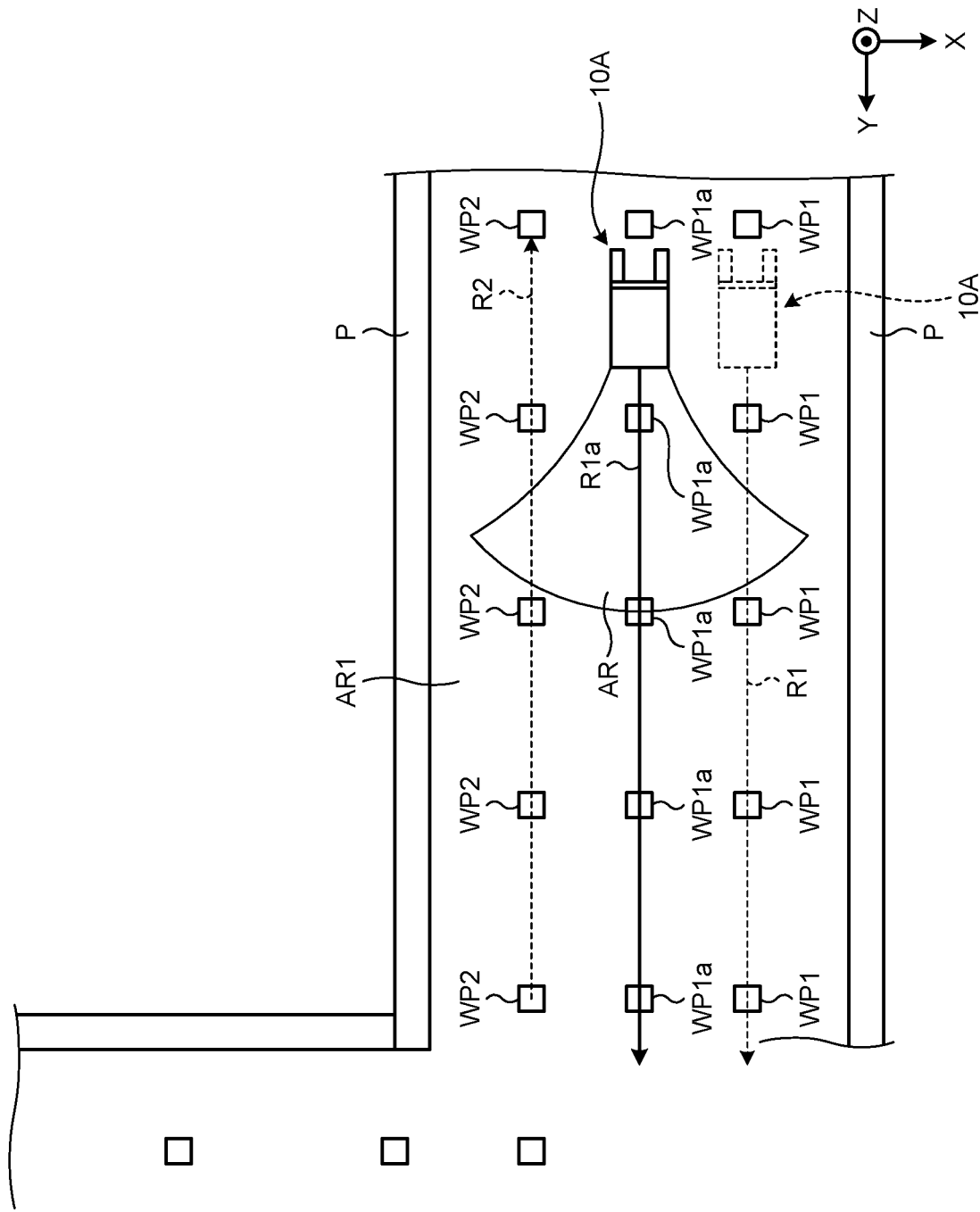
FIG. 8 is a schematic diagram for explaining another example of setting of the route of the mobile object.

FIG. 7 and FIG. 8 are schematic diagrams for explaining other examples of setting of the route of the mobile object. In the following description, as illustrated in FIG. 7, exemplified is a case in which a first route R1 and a second route R2 are set in a passage AR1 in which the mobile object 10 is scheduled to move. The passage AR1 is a passage extending in the Y-direction, and objects P (in this example, walls) the positions of which are fixed are disposed on the X-direction side and the opposite side of the X-direction. The first route R1 is a route running toward the Y-direction (first direction). That is, for example, a plurality of waypoints WP1 arranged in the Y-direction are set in advance in the passage AR1, and it can be said that a route connecting the waypoints WP1 and running toward the Y-direction is the first route R1. The second route R2 is a route arranged on the opposite side of the X-direction (in the lateral direction intersecting with the traveling direction of the first route R1) with respect to the first route R1. That is, for example, a plurality of waypoints WP2 arranged in the Y-direction are set in advance on the opposite side of the X-direction with respect to the waypoints WP1 in the passage AR1, and it can be said that a route connecting the waypoints WP2 and running toward the opposite side of the X-direction is the second route R2. In the present embodiment, the second route R2 is a route running toward the opposite side of the Y-direction, in other words, the opposite lane of the first route R1. However, the second route R2 is not limited to the route running toward the opposite side of the Y-direction, but may be a route running toward the Y-direction side. In the passage AR1, two routes arranged side by side in the lateral direction (two lines of the waypoints WP arranged side by side in the lateral direction) are not necessarily set, but three or more routes arranged side by side in the lateral direction (three or more lines of the waypoints WP arranged side by side in the lateral direction) may be set.

The following exemplifies a case in which the route setting unit 42 sets a route for a first mobile object 10A. The route setting unit 42 sets, as route information on the first mobile object 10A, a route along which the first mobile object 10A moves (the waypoints WP through which the first mobile object 10A passes) and a scheduled time period as a time period in which the first mobile object 10A is scheduled to move along the route. The route setting unit 42 sets the route information for each mobile object 10, so that it can be said that the route setting unit 42 grasps the route information on each mobile object 10. In this example, the route setting unit 42 grasps route information on a second mobile object 10B in advance. In setting the route information on the first mobile object 10A, the route setting unit 42 determines whether the other mobile object (in this example, the second mobile object 10B) is scheduled to move in the passage AR1 in the same time period as the scheduled time period in which the first mobile object 10A moves in the passage AR1 based on the route information on the other mobile object 10 (in this example, the second mobile object 10B). Herein, the same time period does not necessarily indicate that time periods completely overlap each other, but may indicate that the time periods at least partially overlap each other. That is, in this example, the route setting unit 42 determines whether the scheduled time period for the passage AR1 of the first mobile object 10A overlaps the scheduled time period for the passage AR1 of the second mobile object 10B.

In a case in which the other mobile object 10 (in this example, the second mobile object 10B) is scheduled to move in the passage AR1 in the same time period as the scheduled time period in which the first mobile object 10A moves in the passage AR1, as illustrated in FIG. 7, the route setting unit 42 sets the first route R1 and the second route R2 as routes for the first mobile object 10A and the second mobile object 10B. That is, for example, in a case in which the first mobile object 10A is scheduled to move toward the Y-direction side in the passage AR1, and the second mobile object 10B is scheduled to move toward the opposite side of the Y-direction in a passage AR2, the route setting unit 42 sets the first route R1 as a route for the first mobile object 10A and the second route R2 as a route for the second mobile object 10B. The route setting unit 42 transmits information to the first mobile object 10A to permit movement along the first route R1 (waypoints WP1) in the scheduled time period, and transmits information to the second mobile object 10B to permit movement along the second route R2 (waypoints WP2) in the scheduled time period. The first mobile object 10A receives this information and moves along the first route R1 in the scheduled time period, and the second mobile object 10B receives this information and moves along the second route R2 in the scheduled time period.

On the other hand, in a case in which the other mobile object 10 (in this example, the second mobile object 10B) is not scheduled to move in the passage AR1 in the same time period as the scheduled time period in which the first mobile object 10A moves in the passage AR1, as illustrated in FIG. 8, the route setting unit 42 sets a center route R1a as a route for the first mobile object 10A. The center route R1a is a route positioned on the opposite side of the X-direction (on the second route R2 side) with respect to the first route R1, that is, it can be said that a distance between the center route R1a and the object P on the X-direction side is longer than a distance between the first route R1 and the object P on the X-direction side. More specifically, the center route R1a is a route positioned between the first route R1 and the second route R2 in the X-direction. In other words, a plurality of waypoints WP1a arranged in the Y-direction are set at positions between the waypoints WP1 and the waypoints WP2 in the X-direction, and it can be said that a route connecting the waypoints WP1a is the center route R1a. For example, in a case in which the first mobile object 10A is scheduled to move toward the Y-direction side in the passage AR1, the route setting unit 42 transmits information to the first mobile object 10A to permit movement along the center route R1a (waypoints WP1a) in the scheduled time period. The first mobile object 10A receives this information, and moves along the center route R1a toward the Y-direction in the scheduled time period. Similarly to the first route R1 (waypoints WP1) and the second route R2 (waypoints WP2), the center route R1a (waypoints WP1a) may be set in advance, or is not necessarily set in advance. In a case in which the center route R1a is not set in advance, the route setting unit 42 sets the center route R1a between the first route R1 and the second route R2 at the time of setting the route for the first mobile object 10A.

The first mobile object 10A preferably moves along the center route R1a so that a speed at the time of moving along the center route R1a is higher than a speed in a case of assuming that the first mobile object 10A moves along the first route R1. That is, the center route R1a is more distant from the object P on the X-direction side than the first route R1, so that, even if the safety region AR is widened due to an increase in speed, the first mobile object 10A can move along the center route R1a in a state in which the safety region AR does not interfere with the object P on the X-direction side. A moving speed on the center route R1a may be optionally set. For example, the upper limit speed setting unit 40 of the information processing device 14 may set an upper limit speed on the center route R1a, and the first mobile object 10A may move along the center route R1a at a speed equal to or lower than the upper limit speed on the center route R1a. In this case, the center route R1a is more distant from the object P on the X-direction side than the first route R1, so that it can be said that the upper limit speed on the center route R1a is higher than the upper limit speed on the first route R1.

The route setting unit 42 sets information to cause the first mobile object 10A to occupy the passage AR1 in the scheduled time period in which the first mobile object 10A moves along the center route R1a. "To cause the first mobile object 10A to occupy the passage AR1" means that the mobile object 10 other than the first mobile object 10A is prohibited from moving in the passage AR1 in the scheduled time period. That is, for example, it may mean that the mobile object 10 other than the first mobile object 10A is prohibited from using the second route R2 (waypoints WP2) in the scheduled time period.

Figure 9:
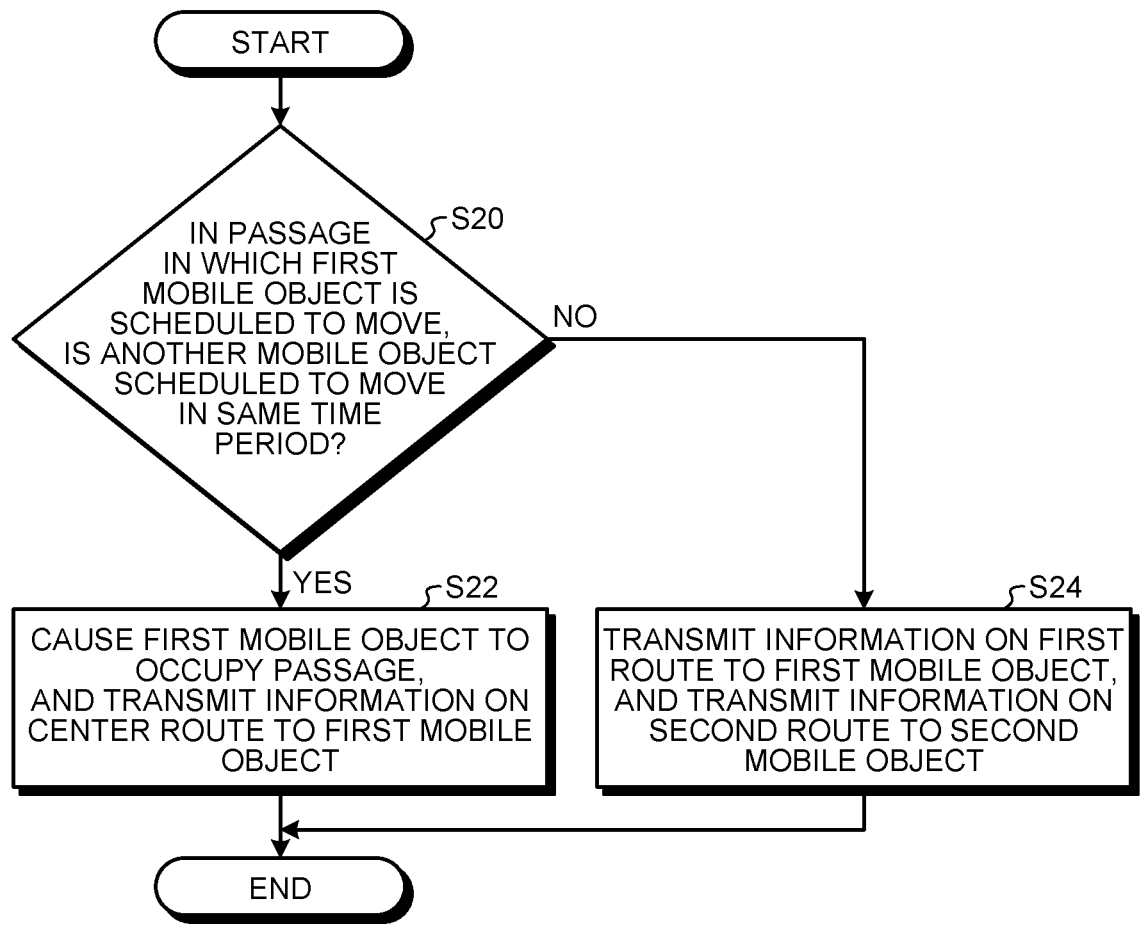
FIG. 9 is a flowchart for explaining a processing flow of route setting in another example.

The following describes a processing flow of route setting described above based on a flowchart. FIG. 9 is a flowchart for explaining the processing flow of route setting in another example. As illustrated in FIG. 9, the route setting unit 42 determines whether the other mobile object 10 is scheduled to move in the same scheduled time period in the passage AR1 in which the first mobile object 10A is scheduled to move (Step S20). If the other mobile object 10 is scheduled to move in the same scheduled time period in the passage AR1 (Yes at Step S20), the route setting unit 42 causes the first mobile object 10A to occupy the passage AR1 in the scheduled time period, and transmits information on the center route R1a to the first mobile object 10A (Step S22). After acquiring the information on the center route R1a, the first mobile object 10A moves along the center route R1a in the scheduled time period. On the other hand, if the other mobile object 10 (herein, the second mobile object 10B) is scheduled to move in the same scheduled time period in the passage AR1 (No at Step S20), the route setting unit 42 transmits information on the first route R1 to the first mobile object 10A, and transmits information on the second route R2 to the second mobile object 10B (Step S24). After acquiring the information on the first route R1, the first mobile object 10A moves along the first route R1 in the scheduled time period. After acquiring the information on the second route R2, the second mobile object 10B moves along the second route R2 in the scheduled time period.

In this way, by causing the first mobile object 10A to move along the center route R1a in a case in which the other mobile object 10 is not scheduled to move in the passage AR1 in the same time period, the moving speed can be increased while suppressing interference between the object P and the safety region AR, and working efficiency can be improved while maintaining safety.

Figure 10:
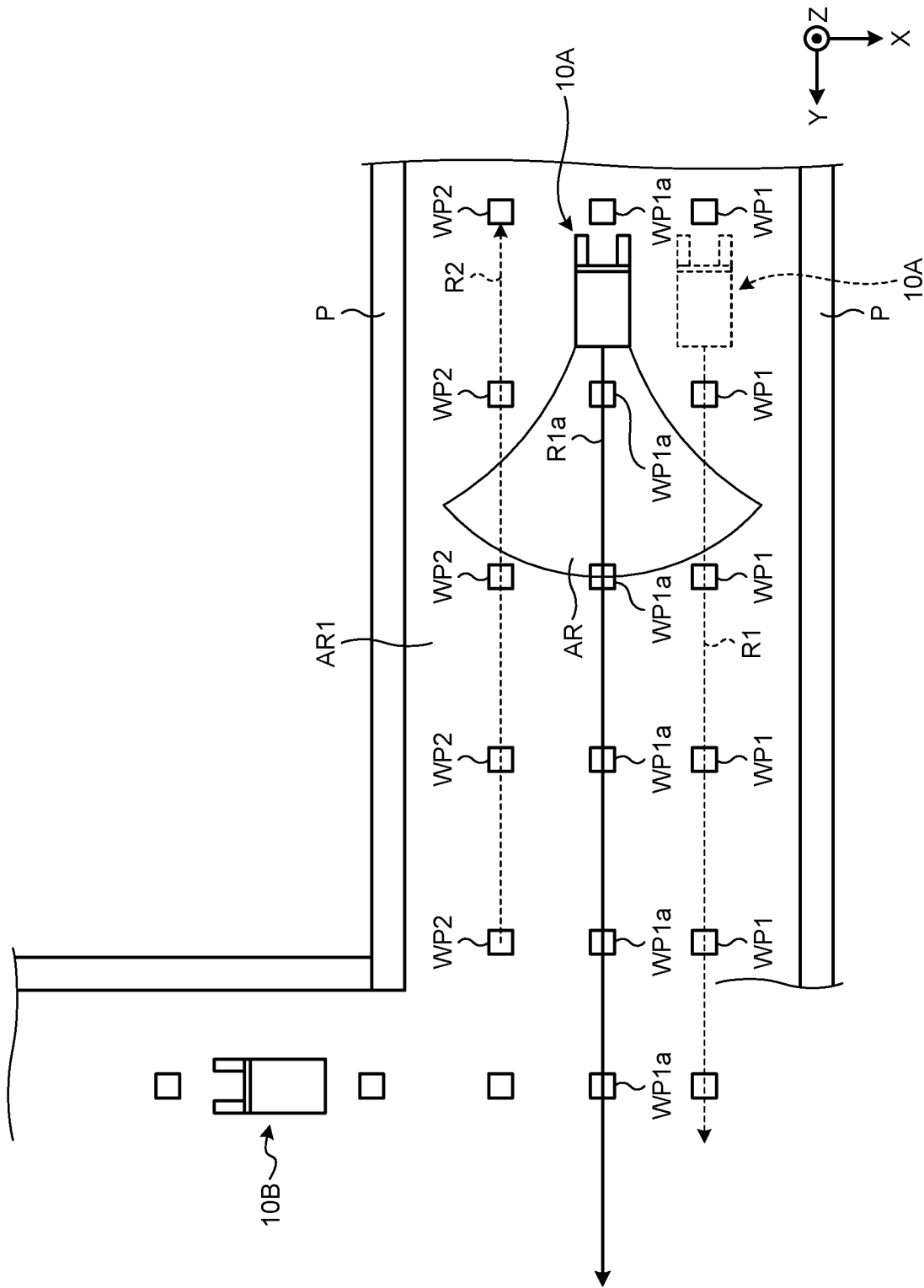
FIG. 10 is a schematic diagram for explaining another example of setting of the route of the mobile object.
Figure 11A:
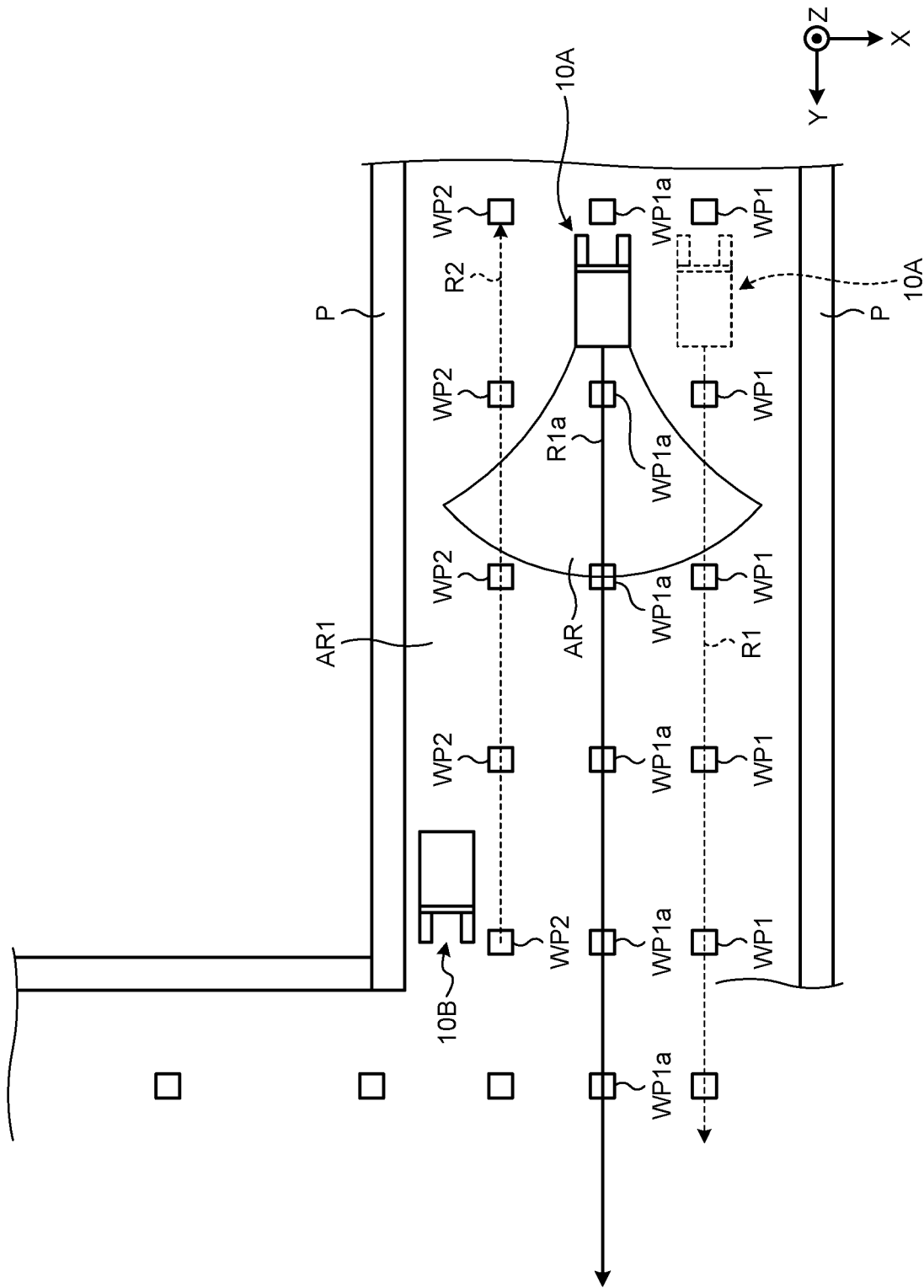
FIG. 11A is a schematic diagram for explaining another example of setting of the route of the mobile object.

In the above description, in a case in which the first mobile object 10A and the second mobile object 10B are scheduled to move in the same time period, the first route R1 and the second route R2 for two-way movement are used without using the center route R1a, but the embodiment is not limited thereto. For example, in a case in which the mobile object 10 that is preferentially moved is selected, the preferential mobile object 10 may be caused to use the center route R1a. That is, in a case in which the first mobile object 10A and the second mobile object 10B are scheduled to move in the passage AR1 in the same time period, and in a case in which the route setting unit 42 acquires preference information indicating that the first mobile object 10A is preferentially moved, the route setting unit 42 may set a center route AR1a as a route for the first mobile object 10A. FIG. 10 and FIG. 11A are schematic diagrams for explaining other examples of setting of the route of the mobile object. In this case, as illustrated in FIG. 10 for example, the route setting unit 42 may cause the first mobile object 10A to occupy the passage AR1, and may give a command to the second mobile object 10B so that the second mobile object 10B is positioned outside the passage AR1 in the scheduled time period. For example, as illustrated in FIG. 11A, in the scheduled time period, the route setting unit 42 may cause the second mobile object 10B to stop at a position on the opposite side of the X-direction with respect to the second route R2 in the passage AR1, or may cause the second mobile object 10B to slowly move along a route positioned on the opposite side of the X-direction with respect to the second route R2 in the passage AR1. A low speed of the second mobile object 10B (an upper limit speed on a route on which the second mobile object 10B slowly moves) is set to be lower than a speed of the second mobile object 10B on the second route R2 (an upper limit speed on the second route R2). In this case, it is preferable to set a position where the second mobile object 10B stops or slowly moves so that the second mobile object 10B is not positioned in the safety region AR of the first mobile object 10A that moves along the center route AR1a, and the first mobile object 10A is not positioned in the safety region AR of the second mobile object 10B.

Other examples of setting of upper limit speed

In the first embodiment, the information processing device 14 sets the upper limit speed by the upper limit speed setting unit 40, but the embodiment is not limited thereto. The mobile object 10 may set the upper limit speed. That is, the mobile object 10 may include the upper limit speed setting unit 40. In this case, reference values independent of the vehicle are applied to movement conditions set in advance (for example, conditions specific to the vehicle the value of which does not vary such as a weight of the mobile object 10) among the movement conditions for the mobile object 10 used for calculating the safety region AR by the upper limit speed setting unit 40 of the information processing device 14, and a temporary upper limit speed is set. The upper limit speed setting unit 40 of the mobile object 10 then applies values corresponding to the vehicle of itself as the movement conditions set in advance before starting to move along the set route R, and calculates the upper limit speed. The mobile object 10 updates the temporary upper limit speed calculated by the information processing device 14 with the upper limit speed calculated by itself. Assuming that the upper limit speed calculated by itself is the upper limit speed on the route R, the mobile object 10 moves at a speed equal to or lower than the upper limit speed. In this case, the information processing device 14 calculates the temporary upper limit speed. However, in a case in which the mobile object 10 calculates the upper limit speed as described above, the information processing device 14 does not necessarily calculate the temporary upper limit speed.

For example, the mobile object 10 may calculate the upper limit speed while moving along the route R. In this case, the mobile object 10 may successively detect the position of the object P by the sensor 26 while moving along the route R, calculate a maximum speed at which the object P is not positioned in the safety region AR as the upper limit speed, and move along the route R at a speed equal to or lower than the calculated upper limit speed.

Other Examples of Setting of Safety Region

In the above description, the safety region AR is, for example, set to include the assumed arrival position A1 (first assumed arrival position) and the assumed arrival position A2 (second assumed arrival position) at the time when the maximum value of the steering angle command is continuously input to the mobile object 10. The following describes other examples of a method for setting the safety region AR. The following exemplifies a case in which the information processing device 12 sets the safety region AR. However, a device that sets the safety region AR is not limited to the information processing device 12, but may be optional. For example, the safety region AR may be set by the mobile object 10.

Another Example 1 of Setting of Safety Region

FIG. 11B is a schematic diagram for explaining another example of the safety region. In the example of FIG. 11B, at the time of setting the safety region AR, the information processing device 12 acquires, as movement conditions for the mobile object 10, the maximum value of the steering angle command that can be input to the mobile object, and a maximum value of a steering angular speed that can be input to the mobile object. The maximum value of the steering angle command indicates a steering angle at the time when the mobile object 10 is steered at a maximum possible angle. The maximum value of the steering angular speed indicates a maximum steering angle at which the mobile object 10 can be steered per unit time (one step of a control cycle).

The information processing device 12 then acquires, as a first reference value of the steering angle command, a steering angle command for each time for orienting the mobile object 10 toward one side of a lateral direction earliest based on the maximum value of the steering angle command and the maximum value of the steering angular speed. Herein, the lateral direction is a direction intersecting with (preferably, a direction orthogonal to) a current traveling direction of the mobile object 10, so that, in the example of FIG. 11B, the current traveling direction is the Y-direction, and one side of the lateral direction is the X-direction. That is, the information processing device 12 acquires, as the first reference value of the steering angle command, the steering angle command for each time for causing the mobile object 10 to turn by 90 degrees earliest toward the X-direction side based on the maximum values of the steering angle command and the steering angular speed. For example, in a case in which the maximum value of the steering angle command is 85 degrees and the maximum value of the steering angular speed is 20 degrees, the first reference value of the steering angle command for each time (per unit time) until the mobile object 10 is oriented in the X-direction earliest may be assumed to be 20 degrees, 40 degrees, 60 degrees, 80 degrees, 85 degrees, 85 degrees, 65 degrees, 45 degrees, 25 degrees, 5 degrees, and 0 degrees toward the X-direction side. The first reference value of the steering angle command after the mobile object 10 is oriented in the X-direction may be assumed to be 0 degrees. The first reference value may be assumed to be a value until the speed of the mobile object 10 becomes 0.

Similarly, the information processing device 12 acquires, as a second reference value of the steering angle command, a steering angle command for each time for orienting the mobile object 10 toward the other side of the lateral direction earliest based on the maximum value of the steering angle command and the maximum value of the steering angular speed. In the example of FIG. 11B, the other side of the lateral direction indicates an opposite direction of the X-direction. That is, the information processing device 12 acquires, as the second reference value of the steering angle command, the steering angle command for each time for causing the mobile object 10 to turn by 90 degrees earliest toward the opposite direction side of the X-direction based on the maximum values of the steering angle command and the steering angular speed. For example in a case in which the maximum value of the steering angle command is 85 degrees and the maximum value of the steering angular speed is 20 degrees, the first reference value of the steering angle command for each time (per unit time) until the mobile object 10 is oriented in the opposite direction of the X-direction earliest may be assumed to be 20 degrees, 40 degrees, 60 degrees, 80 degrees, 85 degrees, 85 degrees, 65 degrees, 45 degrees, 25 degrees, 5 degrees, and 0 degrees toward the opposite direction of the X-direction side. The second reference value of the steering angle command after the mobile object 10 is oriented in the opposite direction of the X-direction may be assumed to be 0 degrees. The first reference value may be assumed to be a value until the speed of the mobile object 10 becomes 0.

The information processing device 12 then sets the safety region AR to include the assumed arrival position A1 (first assumed arrival position) at the time when the first reference value of the steering angle command is input to the mobile object 10 and the assumed arrival position A2 (second assumed arrival position) at the time when the second reference value of the steering angle command is input to the mobile object 10. More specifically, the information processing device 12 may set, as the safety region AR, a region surrounded by the assumed arrival position A1, the assumed arrival position A2, and the current position of the mobile object 10. The assumed arrival position A1 is a position at which the mobile object is assumed to arrive in a case in which the first reference value of the steering angle command is input to the mobile object 10 at each time until the mobile object 10 stops. Similarly, the assumed arrival position A2 is a position at which the mobile object is assumed to arrive in a case in which the second reference value of the steering angle command is input to the mobile object 10 at each time until the mobile object 10 stops.

Herein, a distance by which the mobile object 10 travels for each time until the mobile object 10 turns by 90 degrees depends on the speed of the mobile object 10. Thus, as illustrated in (A) to (C) of FIG. 11B, also in this example, the safety region AR is set to be widened in the lateral direction as the speed of the mobile object 10 increases. Also in this example, similarly to the first embodiment described above, the assumed arrival positions A1 and A2 may be set also based on the reference value of the torque command to set the safety region AR.

As described above, the management method for the mobile object 10 according to this example includes a step of acquiring the movement conditions for the mobile object that automatically moves, and a step of setting the safety region AR based on the movement conditions. At the step of setting the safety region AR, the safety region AR is set so that the safety region AR is widened in the 10 lateral direction intersecting with the traveling direction as the speed of the mobile object 10 increases. At the step of acquiring the movement conditions, based on the maximum value of the steering angle command and the maximum value of the steering angular speed that can be input to the mobile object 10, the steering angle command for each time for orienting the mobile object 10 toward one side of the lateral direction earliest is acquired as the first reference value of the steering angle command, and the steering angle command for each time for orienting the mobile object 10 toward the other side of the lateral direction earliest is acquired as the second reference value of the steering angle command. At the step of setting the safety region AR, the safety region AR is set to include the assumed arrival position AR1 at the time when the first reference value is input to the mobile object 10 and the assumed arrival position A2 at the time when the second reference value is input to the mobile object 10. Thus, according to this example, even in a case in which the mobile object 10 swings at the maximum toward both sides of the lateral direction, positions at which the mobile object can arrive in both directions can be included in the safety region AR. Thus, according to this example, the safety region AR can be appropriately set while considering unreliability of the steering angle command more preferably, and interference with an object present on the lateral direction side can be preferably suppressed.

Another example 2 of setting of safety region FIG. 11C is a schematic diagram for explaining another example of the safety region. In the example of FIG. 11C, at the time of setting the safety region AR, the information processing device 12 acquires, as the movement condition for the mobile object 10, information on a measurement position as a position in the lateral direction of the mobile object 10 at the time when the steering angle command of the mobile object 10 is fixed. That is, in this example, the steering angle command input to the mobile object 10 is fixed (0 degrees), the mobile object 10 is decelerated, and positions on one side and the other side in the lateral direction of the mobile object 10 until the mobile object 10 stops are measured as measurement positions in advance. The measurement position herein may be a difference value between a position in the lateral direction at the time when the mobile object 10 projects most in the lateral direction and a position in the lateral direction of the mobile object 10 immediately before deceleration is started at the time when the steering angle command is fixed until the mobile object 10 stops. The information processing device 12 acquires the measurement position measured in advance as described above.

The information processing device 12 sets the assumed arrival position A1 based on the measurement position on the one side (in this example, the X-direction side) in the lateral direction of the mobile object 10. A method for setting the assumed arrival position A1 based on the measurement position is optional. For example, the information processing device 12 sets the assumed arrival position A1 assuming that a position distant from the current position of the mobile object 10 by a distance corresponding to the measurement position in the X-direction is a position in the X-direction of the assumed arrival position A1, and a position in the Y-direction at the time when the mobile object 10 stops is a position in the Y-direction of the assumed arrival position A1.

Similarly, the information processing device 12 sets the assumed arrival position A2 based on the measurement position on the other side (in this example, an opposite side of the X-direction) in the lateral direction of the mobile object 10. A method for setting the assumed arrival position A2 based on the measurement position is optional. For example, the information processing device 12 sets the assumed arrival position A2 assuming that a position distant from the current position of the mobile object 10 by a distance corresponding to the measurement position in the opposite direction of the X-direction is a position in the X-direction of the assumed arrival position A2, and a position in the Y-direction at the time when the mobile object 10 stops is a position in the Y-direction of the assumed arrival position A2.

The information processing device 12 then sets the safety region AR to include the assumed arrival position A1 and the assumed arrival position A2. For example, as illustrated in FIG. 11C, the information processing device 12 may set, as the safety region AR, a rectangular region surrounded by a position A1A, the assumed arrival position A1, the assumed arrival position A2, and a position A2A.

The position A1A is a position at which the position in the Y-direction matches the current position in the Y-direction of the mobile object 10 (a position immediately before deceleration is started), and the position in the X-direction matches the assumed arrival position A1. A position A1B is a position at which the position in the Y-direction matches the current position in the Y-direction of the mobile object 10 (a position immediately before deceleration is started), and the position in the X-direction matches the assumed arrival position A2.

In this example, the measurement position is preferably measured for each speed of the mobile object immediately before deceleration. That is, it is preferable to associate the speed of the mobile object immediately before deceleration with the measurement position to be measured. The information processing device 12 then selects the measurement position associated with an actual speed of the mobile object 10 from among measurement positions for the respective speeds, and sets the assumed arrival position A1 and the assumed arrival position A2 based on the selected measurement position. The measurement position spreads toward an outer side as the speed of the mobile object immediately before deceleration increases. Thus, also in this example, as illustrated in (A) to (C) of FIG. 11C, the safety region AR is set to be widened in the lateral direction as the speed of the mobile object 10 increases. Also in this example, similarly to the first embodiment described above, the assumed arrival positions A1 and A2 may be set also based on the reference value of the torque command to set the safety region AR.

As described above, the management method for the mobile object 10 according to this example includes the step of acquiring the movement conditions for the mobile object 10 that automatically moves, and the step of setting the safety region AR based on the movement conditions. At the step of setting the safety region AR, the safety region AR is set so that the safety region AR is widened in the lateral direction intersecting with the traveling direction as the speed of the mobile object 10 increases. At the step of acquiring the movement conditions, the information on the measurement position as a position in the lateral direction of the mobile object 10 measured in advance at the time when the steering angle command of the mobile object 10 is fixed is acquired. At the step of setting the safety region AR, the safety region AR is set to include the assumed arrival position AR1 and the assumed arrival position A2 that are set based on the measurement position. Thus, according to this example, considering a case in which the mobile object 10 unintentionally swings to both sides in the lateral direction due to rattling of steering or the like, positions at which the mobile object can arrive in both directions can be included in the safety region AR. Thus, according to this example, the safety region AR can be appropriately set while preferably considering unreliability of the steering angle command, and interference with an object present on the lateral direction side can be preferably suppressed.

Another Example 3 of Setting of Safety Region

Figure 11D:
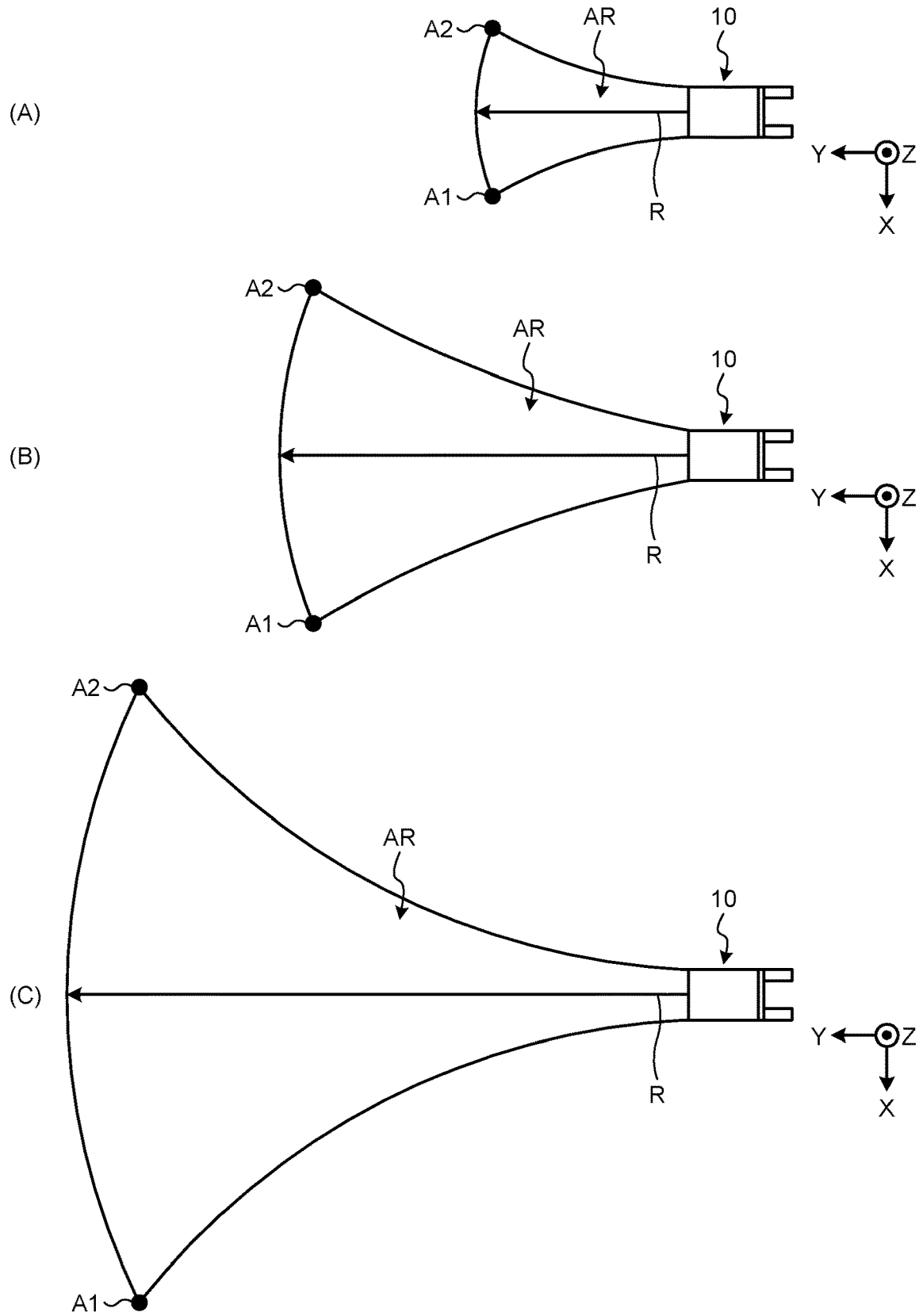
FIG. 11D is a schematic diagram for explaining another example of the safety region.

FIG. 11D is a schematic diagram for explaining another example of the safety region. In the example of FIG. 11D, a learning model (computer program) is caused to perform machine learning about a correspondence relation between the speed of the mobile object and the measurement position. That is, in this example, the measurement positions on the one side and the other side in the lateral direction are measured for each speed of the mobile object immediately before deceleration. By inputting the speed of the mobile object and the measurement position to the learning model as training data, the learning model is caused to perform machine learning. Due to this, the learning model performs machine learning about the correspondence relation between the speed of the mobile object and the measurement position. The learning model that has performed machine learning is enabled to calculate the measurement position when the speed of the mobile object 10 is input as input data. As the learning model, an optional model can be applied. For example, a Convolutional Neural Network (CNN) model or a Recurrent Neural Network (RNN) model may be used.

By inputting an actual speed of the mobile object 10 to the learning model that has performed machine learning, the information processing device 12 calculates the measurement position on the one side in the lateral direction and the measurement position on the other side in the lateral direction. The information processing device 12 then sets the assumed arrival position A1 based on the measurement position on the one side in the lateral direction of the mobile object 10. A method for setting the assumed arrival position A1 based on the measurement position is optional, but a method similar to the example 2 described above may be used. Similarly, the information processing device 12 sets the assumed arrival position A2 based on the measurement position on the other side in the lateral direction of the mobile object 10. A method for setting the assumed arrival position A2 based on the measurement position is optional, but a method similar to the example 2 described above may be used.

The information processing device 12 then sets the safety region AR to include the assumed arrival position A1 and the assumed arrival position A2. More specifically, the information processing device 12 may set, as the safety region AR, a region surrounded by the assumed arrival position A1, the assumed arrival position A2, and the current position of the mobile object 10.

In this example, the learning model that has performed machine learning about the correspondence relation between the speed and the measurement position, so that the safety region AR is set to be widened in the lateral direction as the speed of the mobile object 10 increases as illustrated in (A) to (C) of FIG. 11D. Also in this example, similarly to the first embodiment described above, the assumed arrival positions A1 and A2 may be set also based on the reference value of the torque command to set the safety region AR.

The safety region AR can be appropriately set, and interference with an object present on the lateral direction side can be preferably suppressed.

As described above, in this example, the assumed arrival position A1 and the assumed arrival position A2 are calculated by inputting the speed of the mobile object 10 to the learning model that has performed machine learning about the correspondence relation between the speed of the mobile object and the measurement position at the step of acquiring the movement conditions. Thus, according to this example, considering a case in which the mobile object 10 unintentionally swings to both sides in the lateral direction due to rattling of steering or the like, positions at which the mobile object can arrive in both directions can be included in the safety region AR. Thus, according to this example, the safety region AR can be appropriately set while preferably considering unreliability of the steering angle command, and interference with an object present on the lateral direction side can be preferably suppressed.

Second Embodiment

Next, the following describes a second embodiment. The second embodiment is different from the first embodiment in that the mobile object 10 switches the route R. In the second embodiment, the same configurations as those in the first embodiment will not be described again.

In the second embodiment, the detection control unit 68 of the mobile object 10 detects whether the other mobile object is present in a range of a first distance L1 on the traveling direction side of the mobile object 10, and detects whether the object P the position of which is fixed (such as a structure or a boundary) is present in a range of a second distance L2 on the lateral direction side. In a case in which the other mobile object is absent in the range of the first distance L1 on the traveling direction side, and the object P the position of which is fixed is absent in the range of the second distance L2 on the lateral direction side, the movement control unit 64 of the mobile object 10 switches the route along which the mobile object 10 moves to the lateral direction side, and causes the mobile object 10 to move along the route on the lateral direction side. The detection control unit 68 detects whether the other mobile object or the object P the position of which is fixed is present by the sensor 26. However, the object P the position of which is fixed may be detected based on the map information and the self-position because the position thereof is known. The first distance L1 and the second distance L2 may be optionally set, but are set to be longer than a distance from the self-position of the mobile object 10 to an outer edge of the safety region AR. The following describes switching of the route more specifically.

Figure 12:
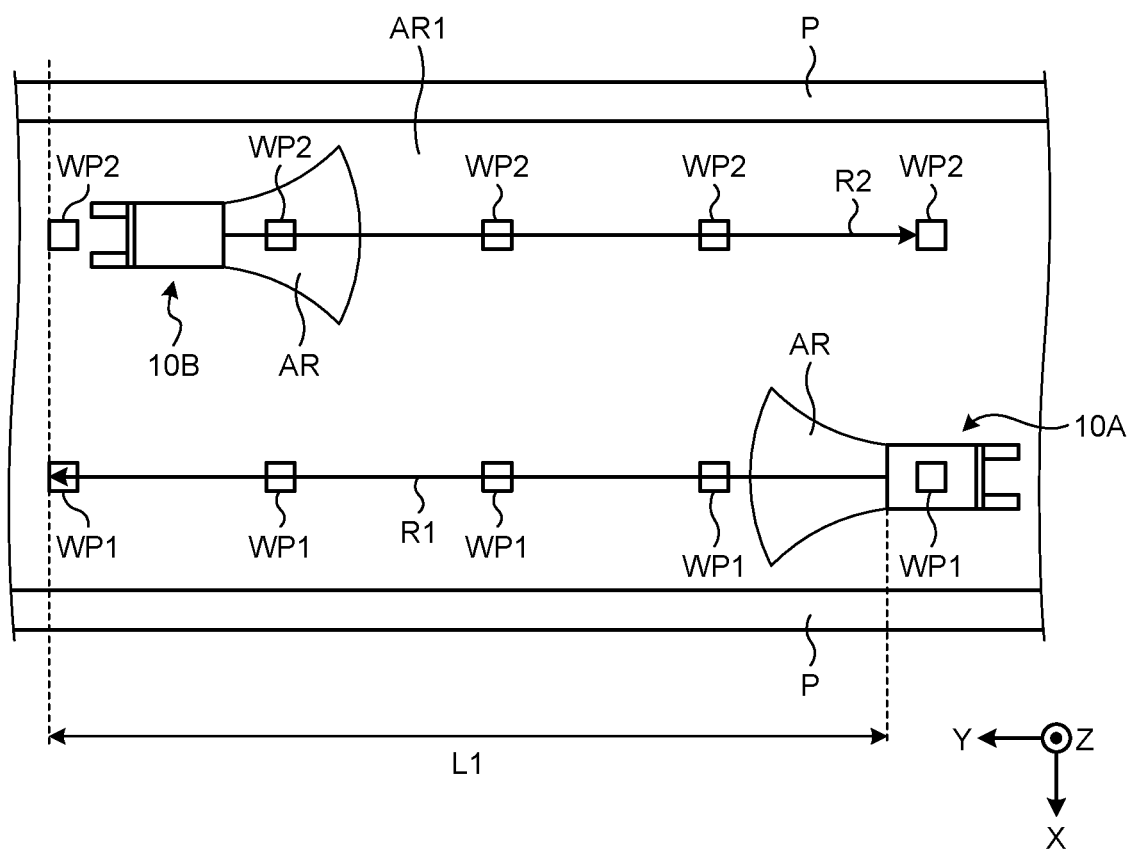
FIG. 12 is a schematic diagram for explaining setting of a route of a mobile object according to a second embodiment.
Figure 13:
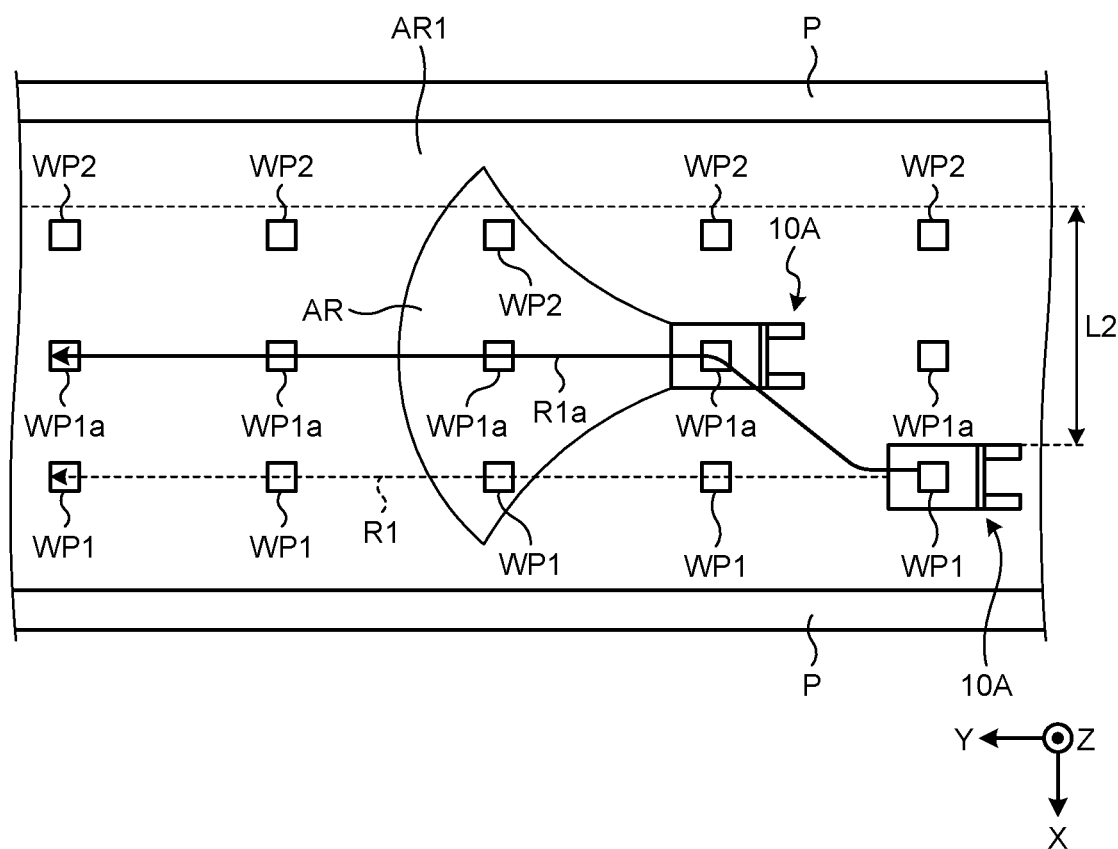
FIG. 13 is a schematic diagram for explaining setting of the route of the mobile object according to the second embodiment.
Figure 14:
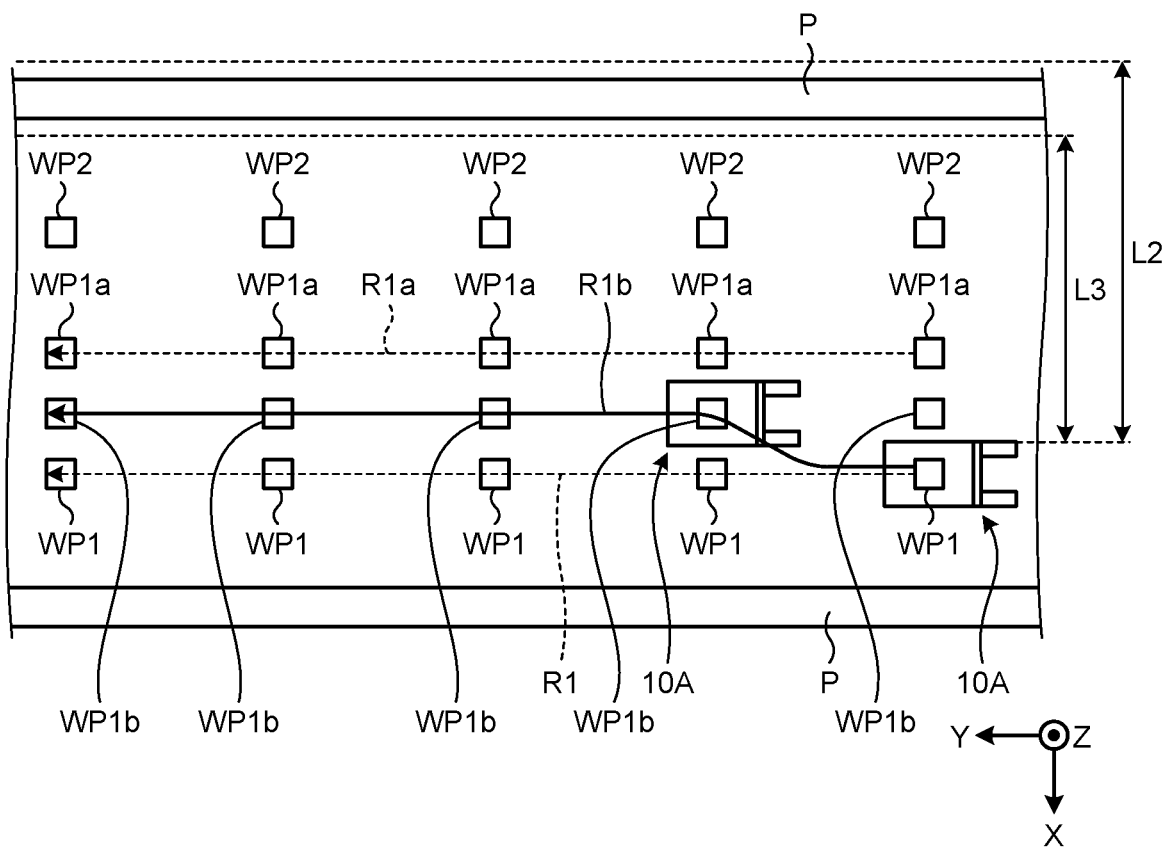
FIG. 14 is a schematic diagram for explaining setting of the route of the mobile object according to the second embodiment.

FIG. 12 to FIG. 14 are schematic diagrams for explaining setting of the route of the mobile object according to the second embodiment. In the following description, as illustrated in FIG. 12, exemplified is a case in which the first route R1 and the second route R2 are set in the passage AR1, and the first mobile object 10A is moving along the first route R1 set by the information processing device 14. The detection control unit 68 of the first mobile object 10A detects whether the other mobile object 10 is present in the range of the first distance L1 on the Y-direction side (traveling direction side) during movement along the first route R1. That is, the detection control unit 68 of the first mobile object 10A detects whether the other mobile object 10 positioned on the Y-direction side with respect to the first mobile object 10A is present in a range from a current position of the first mobile object 10A to a position distant therefrom by the first distance L1 toward the Y-direction side. As illustrated in FIG. 12, in a case in which the other mobile object 10 is present in the range of the first distance L1 on the Y-direction side of the first mobile object 10A, the movement control unit 64 of the first mobile object 10A does not switch the route, and continues movement along the first route R1. That is, in the example of FIG. 12, the second mobile object 10B moving toward the opposite side of the Y-direction along the second route R2 is present in the range of the first distance L1 on the Y-direction side of the first mobile object 10A, so that the movement control unit 64 of the first mobile object 10A does not switch the route, and continues movement along the first route R1.

The detection control unit 68 of the first mobile object 10A also detects whether the object P the position of which is fixed is present in the range of the second distance L2 on the opposite side of the X-direction (lateral direction side) during movement along the first route R1. That is, the detection control unit 68 of the first mobile object 10A detects whether the object P positioned on the opposite side of the X-direction with respect to the first mobile object 10A is present in the range of the second distance L2 from the current position of the first mobile object 10A. As illustrated in FIG. 13, in a case in which the other mobile object 10 is absent in the range of the first distance L1 on the Y-direction side of the first mobile object 10A, and the object P is absent in the range of the second distance L2 on the opposite side of the X-direction, the movement control unit 64 of the first mobile object 10A switches the first route R1 to the center route R1a on the opposite side of the X-direction, and causes the first mobile object 10A to move along the center route R1a. In this case, the first mobile object 10A preferably moves along the center route R1a so that the speed at the time of moving along the center route R1a is higher than the speed at the time of moving along the first route R1. The moving speed on the center route R1a may be optionally set. For example, the upper limit speed setting unit 40 of the information processing device 14 may set the upper limit speed on the center route R1a, or the first mobile object 10A may set the upper limit speed on the center route R1a. In this case, the first mobile object 10A may move along the center route R1a at a speed equal to or lower than the upper limit speed on the center route R1a.

On the other hand, as illustrated in FIG. 14, in a case in which the other mobile object 10 is absent in the range of the first distance L1 on the Y-direction side of the first mobile object 10A, and the object P is present in the range of the second distance L2 on the opposite side of the X-direction, the movement control unit 64 determines whether the object P on the opposite side of the X-direction is present in a range of a third distance L3 shorter than the second distance L2 with respect to the first mobile object 10A. The third distance L3 may be optionally set, is shorter than the second distance L2, and is longer than a distance from the self-position of the mobile object 10 to the outer edge of the safety region AR. In a case in which the object P on the opposite side of the X-direction is present in the range of the third distance L3 with respect to the first mobile object 10A, that is, a distance to the object P is shorter than the third distance L3, the movement control unit 64 of the first mobile object 10A does not switch the route, and continues movement along the first route R1. On the other hand, in a case in which the object P on the opposite side of the X-direction is absent in the range of the third distance L3 with respect to the first mobile object 10A, that is, in a case in which a distance to the object P is longer than the third distance L3, the movement control unit 64 of the first mobile object 10A switches the first route R1 to a route R1b that is distant therefrom toward the opposite side of the X-direction by a predetermined distance, and causes the first mobile object 10A to move along the route R1b. The route R1b is a route positioned on the opposite side of the X-direction with respect to the first route R1, and is a route positioned between the first route R1 and the center route R1a in the X-direction. In other words, a plurality of waypoints WP1b arranged in the Y-direction are set at positions between the waypoints WP1 and the waypoints WP1a in the X-direction, and it can be said that a route connecting the waypoints WP1b is the route R1b. Similarly to the first route R1 (waypoints WP1) and the second route R2 (waypoints WP2), the route R1b (waypoints WP1b) may be set in advance, or is not necessarily set in advance. In a case in which the route R1b is not set in advance, while the first mobile object 10A is moving along the first route R1, the information processing device 14 may set the route R1b, or the first mobile object 10A may set the route R1b. A distance (predetermined distance) between the first route R1 and the route R1b may be optionally set.

Also at the time of moving along the route R1b, the first mobile object 10A preferably moves along the route R1b at a speed higher than the speed at the time of moving along the first route R1. The moving speed on the route R1b may be optionally set. For example, the upper limit speed setting unit 40 of the information processing device 14 may set the upper limit speed on the route R1b, or the first mobile object 10A may set the upper limit speed on the route R1b. In this case, the first mobile object 10A may move along the route R1b at a speed equal to or lower than the upper limit speed on the route R1b.

Figure 15:
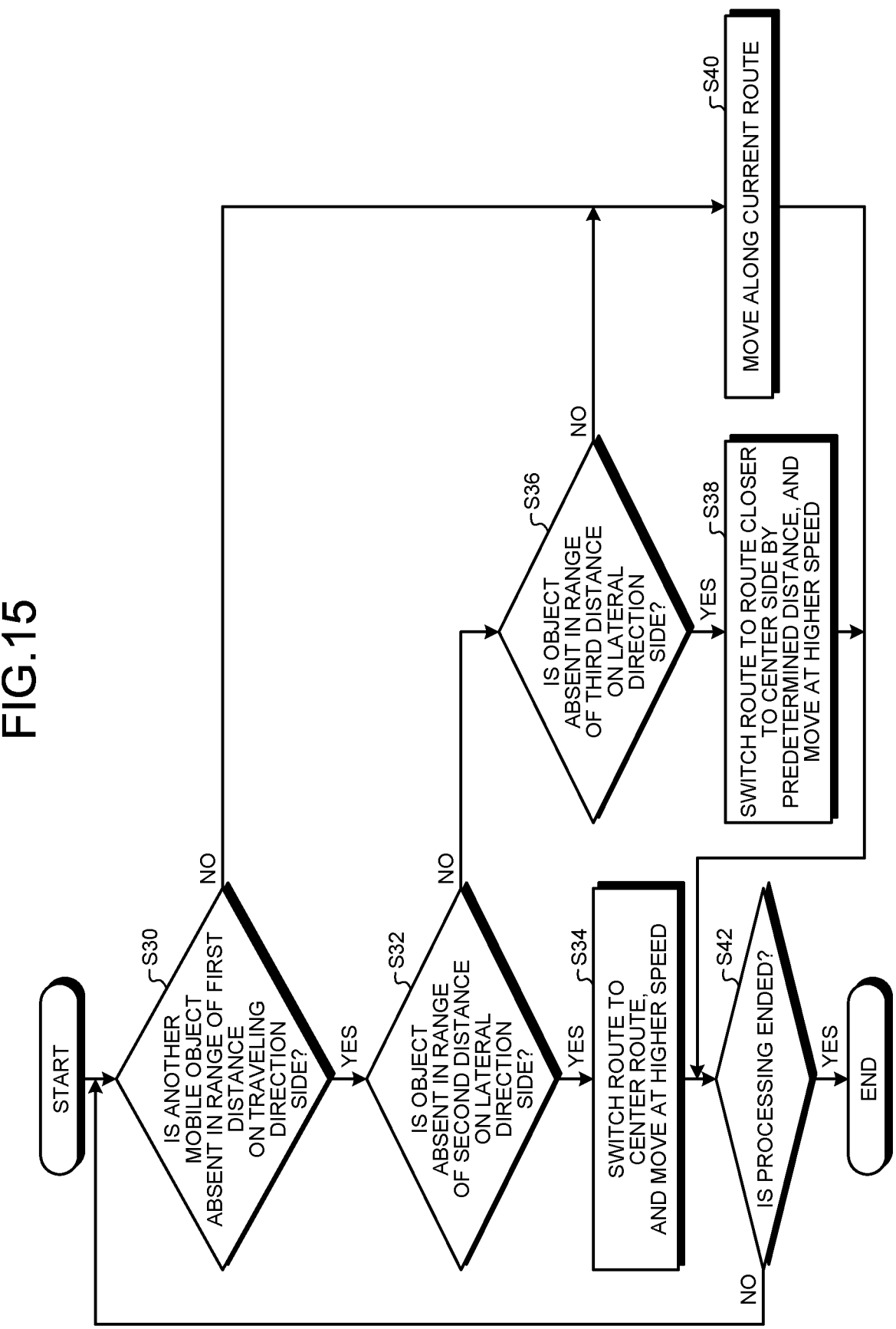
FIG. 15 is a flowchart for explaining a processing flow of route switching according to the second embodiment.

The following describes a processing flow of route switching described above based on a flowchart. FIG. 15 is a flowchart for explaining the processing flow of route switching according to the second embodiment. As illustrated in FIG. 15, in the second embodiment, the detection control unit 68 of the first mobile object 10A detects whether the other mobile object 10 is absent in the range of the first distance L1 on the Y-direction side (traveling direction side) during movement along the first route R1 (Step S30). If the other mobile object 10 is absent (Yes at Step S30), the detection control unit 68 detects whether the object P the position of which is fixed is absent in the range of the second distance L2 on the opposite side of the X-direction (lateral direction side) (Step S32). If the object P is absent in the range of the second distance L2 on the opposite side of the X-direction (Yes at Step S32), the movement control unit 64 of the first mobile object 10A switches the first route R1 to the center route R1a, and causes the first mobile object 10A to move along the center route R1a at a higher speed (Step S34).

On the other hand, in a case in which the object P is present in the range of the second distance L2 on the opposite side of the X-direction (No at Step S32), and in a case in which the object P is absent in the range of the third distance L3 on the opposite side of the X-direction (Yes at Step S36), the movement control unit 64 of the first mobile object 10A switches the first route R1 to the route R1b, which is distant from the first route R1 by a predetermined distance toward the opposite side of the X-direction (center side), and causes the first mobile object 10A to move along the route R1b at a higher speed (Step S38).

In a case in which the object P is present in the range of the second distance L2 on the opposite side of the X-direction (No at Step S32), and in a case in which the object P is present in the range of the third distance L3 on the opposite side of the X-direction (No at Step S36), the movement control unit 64 of the first mobile object 10A does not switch the route, and continues movement along the current route (first route R1) (Step S40). Similarly, in a case in which the other mobile object 10 is present in the range of the first distance L1 on the Y-direction side (traveling direction side) (No at Step S30), the movement control unit 64 of the first mobile object 10A does not switch the route, and continues movement along the current route (first route R1) (Step S40). After Step S34, S38, or S40 is performed, the process proceeds to Step S42. In a case of not ending the processing (No at Step S42), the process returns to Step S30, and the processing is continued. In a case of ending the processing (Yes at Step S42), this processing is ended.

As described above, in the second embodiment, in a case in which the other mobile object is absent in the range of the first distance L1 on the traveling direction side, and the object P is absent in the range of the second distance L2 on the lateral direction side, the movement control unit 64 of the first mobile object 10A switches the route of the first mobile object 10A toward the lateral direction side. In this way, by switching the route of the first mobile object 10A to be closer to the center in a case in which a distance to the object P is enough, the moving speed can be increased while suppressing interference between the object P and the safety region AR, and working efficiency can be improved while maintaining safety.

Figure 16:
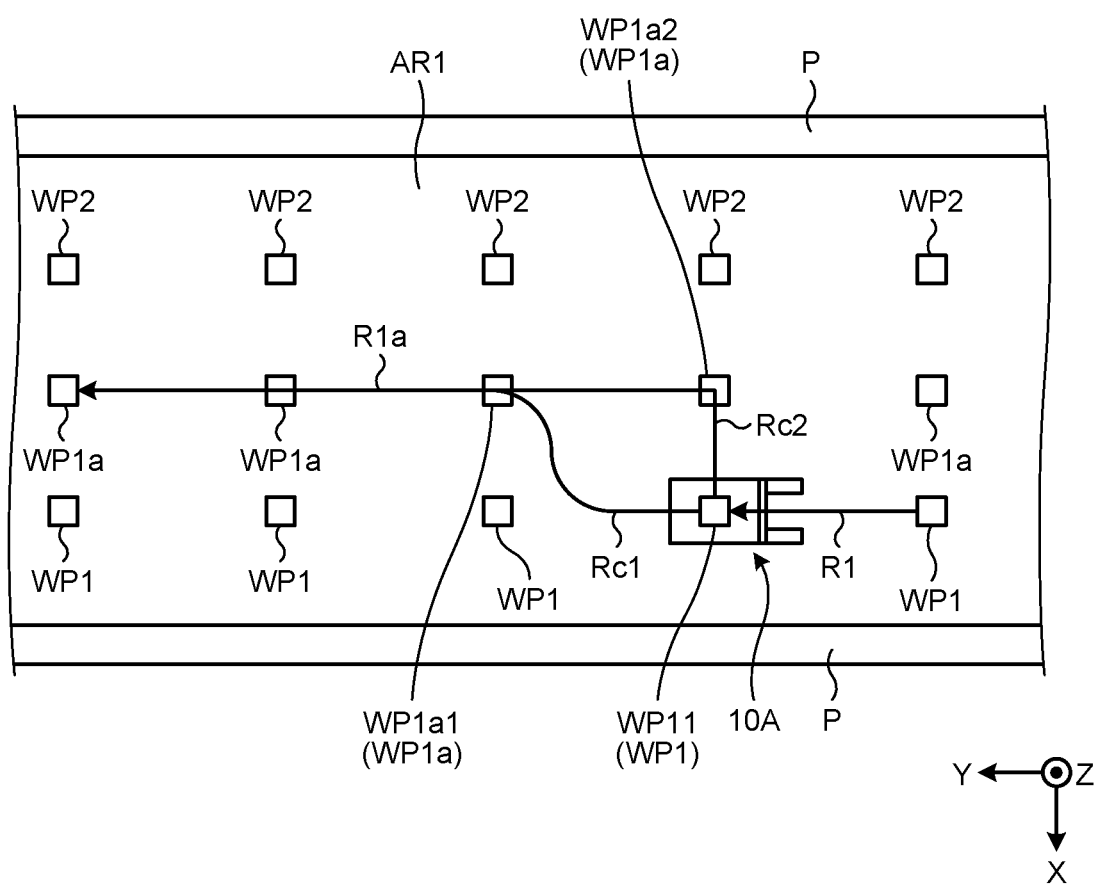
FIG. 16 is a schematic diagram of a switching route.

FIG. 16 is a schematic diagram of a switching route. At the time of switching the route by the mobile object 10, the position of the mobile object 10 immediately before the switching and the position of the mobile object 10 immediately after the switching preferably make a curved shape. That is, assuming that the switching route is a route connecting the position of the mobile object 10 immediately before the switching and the position of the mobile object 10 immediately after the switching, the switching route preferably has a curved shape when viewed from the Z-direction. For example, as illustrated in FIG. 16, exemplified is a case of switching the first route R1 to the center route R1a. In this case, assuming that the position of the mobile object 10 on the first route R1 immediately before the switching is a waypoint WP11, a switching route Rc1 is preferably set so that the position of the mobile object 10 on the center route R1a immediately after the switching becomes a waypoint WP1a1. The waypoint WP1a1 is positioned on the opposite side of the X-direction and on the Y-direction side (traveling direction side) with respect to the waypoint WP11. The switching route Rc1 is preferably set to have a curved shape (for example, a spline shape) connecting the waypoint WP11 and the waypoint WP1a1. However, the switching route is not necessarily set to have a curved shape like the switching route Rc1, but may be set to have a linear shape like a switching route Rc2, for example. In this case, for example, the switching route Rc2 may be set so that the position of the mobile object 10 on the center route R1a immediately after the switching becomes a waypoint WP1a2. The waypoint WP1a2 is positioned on the opposite side of the X-direction with respect to the waypoint WP11, and positioned at the same position as the waypoint WP11 on the Y-direction side.

Effects

As described above, the management method for the mobile object 10 according to the present disclosure includes a step of acquiring the movement conditions for the mobile object 10 that automatically moves, and a step of setting the safety region AR as a region on the traveling direction side of the mobile object 10 in which the object P should not be positioned based on the movement conditions. At the step of setting the safety region AR, the safety region AR is set so that the safety region AR is widened in the lateral direction intersecting with the traveling direction as the speed of the mobile object 10 increases. In this way, by setting the safety region AR to be wide in the lateral direction depending on the speed, interference between the mobile object 10 and the object P present in the lateral direction can be appropriately suppressed even in a case in which the mobile object 10 unintentionally moves in the lateral direction before stopping due to unreliable steering, for example.

At the step of acquiring the movement conditions, the reference value of the steering angle command for the mobile object 10 is acquired. At the step of setting the safety region AR, the safety region AR is set to include the assumed arrival position at which the mobile object is assumed to arrive at the time of stoppage in a case in which the reference value of the steering angle command is input. In this way, by setting the safety region AR based on the reference value of the steering angle command, the safety region AR that is wide in the lateral direction can be appropriately set, so that interference with the object P present in the lateral direction can be suppressed more appropriately.

At the step of acquiring the movement conditions, the reference value of the torque command for stopping the mobile object 10 is acquired. At the step of setting the safety region AR, the safety region AR is set to include the assumed arrival position at which the mobile object is assumed to arrive at the time of stoppage in a case in which the reference value of the steering angle command and the reference value of the torque command are input. In this way, by setting the safety region AR based on the reference values of the steering angle command and the torque command, the safety region AR that is wide in the lateral direction can be appropriately set, so that interference with the object P present in the lateral direction can be suppressed more appropriately.

The management method for the mobile object 10 according to the present disclosure further includes a step of setting the upper limit speed of the mobile object 10. At the step of setting the upper limit speed, the upper limit speed is set so that the object P is not positioned in the safety region AR in a case in which the mobile object 10 moves at the upper limit speed. In this way, by setting the upper limit speed based on the safety region AR, the upper limit speed can be increased for a route positioned away from the known object P, for example, so that working efficiency can be improved while suppressing interference with the object P.

The management method for the mobile object 10 according to the present disclosure includes: a step of determining, in a case in which the first mobile object 10A is scheduled to move in the first direction in the passage AR1 in which the first route R1 running toward the Y-direction (first direction) and the second route R2 arranged side by side with the first route R1 in the lateral direction (opposite direction of the X-direction) are set, whether the second mobile object 10B is scheduled to move in the passage AR1 in the same time period; and a step of causing the center route R1a positioned on the second route R2 side with respect to the first route R1 to be the route of the first mobile object 10A in a case in which the second mobile object 10B is not scheduled to move in the passage AR1 in the same time period. In this way, by causing the first mobile object 10A to move along the center route R1a in a case in which the other mobile object 10 is not scheduled to move in the passage AR1 in the same time period, the moving speed can be increased while suppressing interference between the object P and the safety region AR, and working efficiency can be improved while maintaining safety.

The management method for the mobile object 10 according to the present disclosure further includes a step of causing the first route R1 to be the route of the first mobile object 10A, and causing the second route R2 to be the route of the second mobile object 10B in a case in which the second mobile object 10B is scheduled to move in the passage AR1 in the same time period. In this way, by causing the mobile objects 10 to respectively move along routes for two-way movement in a case in which the other mobile object 10 is scheduled to move in the passage AR1 in the same time period, it is possible to cause the respective mobile objects 10 to move appropriately.

In the management method for the mobile object 10 according to the present disclosure, in a case in which the second mobile object 10B is scheduled to move in the passage AR1 in the same time period, and in a case in which the preference information indicating that the first mobile object 10A is preferentially moved is acquired, the center route R1a is caused to be the route for the first mobile object 10A. Even in a case in which a plurality of the mobile objects 10 are scheduled to move in the passage AR1 in the same time period, the mobile object 10 that should be preferentially moved can be appropriately moved by causing the mobile object 10 that should be preferentially moved to move along the center route R1a.

The control method for the mobile object 10 according to the present disclosure includes a step of acquiring the information on the safety region AR, and a step of causing the mobile object 10 to move while detecting whether the object P is positioned in the safety region AR. According to this control method, even in a case in which the mobile object 10 unintentionally moves in the lateral direction before stopping due to unreliable steering, interference between the mobile object 10 and the object P present in the lateral direction can be appropriately suppressed.

The control method for the mobile object 10 according to the present disclosure further includes a step of detecting whether the other mobile object is present in the range of the first distance L1 on the traveling direction side of the mobile object 10, a step of detecting whether the object P the position of which is fixed is present in the range of the second distance L2 on the lateral direction side of the mobile object 10, and a step of switching the route along which the mobile object 10 moves to the lateral direction side in a case in which the other mobile object is absent in the range of the first distance L1 and the object P is absent in the range of the second distance L2. According to this control method, by switching the route to be closer to the center in a case in which a distance to the object P is enough, the moving speed can be increased while suppressing interference between the object P and the safety region AR, and working efficiency can be improved while maintaining safety.

The mobile object 10 according to the present disclosure includes the safety region acquisition unit 66 that acquires the information on the safety region AR that is set based on the movement conditions for the mobile object 10 as a region on the traveling direction side of the mobile object 10 in which the object P should not be positioned, and the movement control unit 64 that causes the mobile object 10 to move while detecting whether the object P is positioned in the safety region AR. The safety region AR is set to be widened in the lateral direction intersecting with the traveling direction as the speed of the mobile object 10 increases. The mobile object 10 can appropriately suppress interference with the object P present in the lateral direction even in a case in which the mobile object 10 unintentionally moves in the lateral direction before stopping due to unreliable steering.

The embodiments of the present disclosure have been described above, but the embodiments are not limited thereto. The constituent elements described above encompass a constituent element that is easily conceivable by those skilled in the art, substantially the same constituent element, and what is called an equivalent.

Additionally, the constituent elements described above can be appropriately combined with each other. Furthermore, the constituent elements can be variously omitted, replaced, or modified without departing from the gist of the embodiments described above.

REFERENCE SIGNS LIST

10 Mobile object
10A First mobile object
10B Second mobile object
12 Information processing device
40 Upper limit speed setting unit
42 Route setting unit
60 Route acquisition unit
62 Upper limit speed acquisition unit
64 Movement control unit
66 Safety region acquisition unit
68 Detection control unit
AR Safety region
R Route

The invention claimed is:
1. A control method for a mobile object, comprising:
acquiring movement conditions for the mobile object that automatically moves;

setting based on the movement conditions a safety region as a region on a side of a traveling direction of the mobile object in which an object is not expected to be positioned;

determining, in a case in which a first mobile object is scheduled to move toward a first direction in a passage in which a first route running toward the first direction and a second route arranged side by side with the first route in a lateral direction intersecting with the traveling direction are set, whether a second mobile object is scheduled to move in the passage in the same time period;

causing, in a case in which the second mobile object is not scheduled to move in the passage in the same time period, a center route positioned to be closer to a side of the second route than the first route to be a route for the first mobile object; and causing the mobile object to move while detecting whether the object is not positioned in the safety region, wherein the setting of the safety region includes setting the safety region so that the safety region is widened in the lateral direction as a speed of the mobile object increases, the acquiring of the movement conditions includes, based on a maximum value of a steering angle command and a maximum value of a steering angular speed that are able to be input to the mobile object, acquiring a steering angle command for each time for orienting the mobile object toward one side of the lateral direction earliest as a first reference value of the steering angle command, and acquiring a steering angle command for each time for orienting the mobile object toward the other side of the lateral direction earliest as a second reference value of the steering angle command, and the setting of the safety region includes setting the safety region to include a first assumed arrival position at the time when the first reference value is input to the mobile object and a second assumed arrival position at the time when the second reference value is input to the mobile object.

2. The control method for the mobile object according to claim 1, wherein the acquiring of the movement conditions includes acquiring a reference value of a torque command for stopping the mobile object, and the setting of the safety region includes setting also based on the reference value of the torque command the first assumed arrival position and the second assumed arrival position.

3. The control method for the mobile object according to claim 1, further comprising:

setting an upper limit speed of the mobile object, wherein the setting of the upper limit speed includes setting the upper limit speed so that the object is not positioned in the safety region in a case in which the mobile object moves at the upper limit speed.

4. The control method for the mobile object according to claim 1, further comprising:

causing, in a case in which the second mobile object is scheduled to move in the passage in the same time period, the first route to be a route for the first mobile object and causing the second route to be a route for the second mobile object.

5. The control method for the mobile object according to claim 1, wherein, in a case in which the second mobile object is scheduled to move in the passage in the same time period, and in a case in which preference information indicating that the first mobile object is preferentially caused to move is acquired, the center route is caused to be a route for the first mobile object.

6. The control method for the mobile object according to claim 1, further comprising:

detecting whether another mobile object is present in a first distance range on the side of the traveling direction of the mobile object;

detecting whether the object with a fixed position is present in a second distance range on a side of the lateral direction of the mobile object; and switching a route along which the mobile object moves to the side of the lateral direction in a case in which another mobile object is absent in the first distance range and the object is absent in the second distance range.

7. A mobile object that automatically moves, comprising:

a central processing unit (CPU) that:

acquires information on a safety region that is set based on movement conditions for the mobile object as a region on a side of a traveling direction of the mobile object in which an object is not expected to be positioned;

causes the mobile object to move while detecting whether the object is not positioned in the safety region;

determines, in a case in which a first mobile object is scheduled to move toward a first direction in a passage in which a first route running toward the first direction and a second route arranged side by side with the first route in a lateral direction intersecting with the traveling direction are set, whether a second mobile object is scheduled to move in the passage in the same time period; and causes, in a case in which the second mobile object is not scheduled to move in the passage in the same time period, a center route positioned to be closer to a side of the second route than the first route to be a route for the first mobile object, wherein the safety region is set to be widened in the lateral direction as a speed of the mobile object increases, and to include a first assumed arrival position at the time when a first reference value is input to the mobile object and a second assumed arrival position at the time when a second reference value is input to the mobile object, the first reference value is a steering angle command for each time for orienting the mobile object toward one side of the lateral direction earliest that is set based on a maximum value of the steering angle command and a maximum value of a steering angular speed that are able to be input to the mobile object, and the second reference value is a steering angle command for each time for orienting the mobile object toward the other side of the lateral direction earliest that is set based on the maximum value of the steering angle command and the maximum value of the steering angular speed that are able to be input to the mobile object.

8. A non-transitory computer-readable recording medium storing a computer program that causes a computer to execute:

acquiring movement conditions for a mobile object that automatically moves;

setting based on the movement conditions a safety region as a region on a side of a traveling direction of the mobile object in which an object is not expected to be positioned;

determining, in a case in which a first mobile object is scheduled to move toward a first direction in a passage in which a first route running toward the first direction and a second route arranged side by side with the first route in a lateral direction intersecting with the traveling direction are set, whether a second mobile object is scheduled to move in the passage in the same time period;

causing, in a case in which the second mobile object is not scheduled to move in the passage in the same time period, a center route positioned to be closer to a side of the second route than the first route to be a route for the first mobile object; and causing the mobile object to move while detecting whether the object is not positioned in the safety region, wherein the setting of the safety region includes setting the safety region so that the safety region is widened in the lateral direction as a speed of the mobile object increases, the acquiring of the movement conditions includes, based on a maximum value of a steering angle command and a maximum value of a steering angular speed that are able to be input to the mobile object,
- acquiring a steering angle command for each time for orienting the mobile object toward one side of the lateral direction earliest as a first reference value of the steering angle command, and
- acquiring a steering angle command for each time for orienting the mobile object toward the other side of the lateral direction earliest as a second reference value of the steering angle command, and the setting of the safety region includes setting the safety region to include a first assumed arrival position at the time when the first reference value is input to the mobile object and a second assumed arrival position at the time when the second reference value is input to the mobile object.

* * * * *